United States Patent
Jayaraman et al.

(10) Patent No.: US 10,831,688 B2
(45) Date of Patent: Nov. 10, 2020

(54) RECONFIGURABLE NETWORK INFRASTRUCTURE

(71) Applicant: International Business Machines Corporation, Armonk, NY (US)

(72) Inventors: Prasanna Jayaraman, Austin, TX (US); Daniel M. Dreps, Georgetown, TX (US); Erich J. Hauptli, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 16/106,847

(22) Filed: Aug. 21, 2018

(65) Prior Publication Data

US 2020/0065283 A1 Feb. 27, 2020

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | |
|---|---|---|
| 7,210,048 B2 | 4/2007 | Bodas |
| 7,561,163 B1 | 7/2009 | Johnson |
| 8,253,749 B1 | 8/2012 | Lichtenbelt et al. |

(Continued)

FOREIGN PATENT DOCUMENTS

CN 105117170 A 12/2015

OTHER PUBLICATIONS

Anonymously, "Method for Data Transfer Optimization for a GPU in a JIT compiler"; http://ip.com/IPCOM/000250407D; Jul. 11, 2017, 4 pages.
Anonymously, "Topology-Aware Resource Allocation in Multi-GPU Architecture"; http://ip.com/IPCOM/000247369D; Aug. 29, 2016, 5 pages.

(Continued)

*Primary Examiner* — Farley Abad
*Assistant Examiner* — Dayton Lewis-Taylor
(74) *Attorney, Agent, or Firm* — Scully, Scott, Murphy & Presser, P.C.; Jason Sosa, Esq.

(57) ABSTRACT

A method, a system and a computer program product for supporting a reconfigurable hardware network topology including graphics processor units (GPU) and central processing unit (CPU) interconnectivity. The re-configurability of the network is based on data bandwidth and latency requirements of running workloads obtained by running training workload sequences upon the configured topology. For network re-configurability, a user enabled to directly connect high-speed cable links between CPU/GPU connectors and between GPU/GPU connectors. Further included in a configured network topology are switches configurable to provide one or more PCIe high-speed side-band links, as well as a high speed multiplexor, that can switch the network topology. The method prepares a system map of the hardware network topology, and generates a GPU weightage pattern based on data bandwidth and latencies of the configured GPUs such that GPUs are assigned to workloads based on its weightage to optimize workload performance.

20 Claims, 19 Drawing Sheets

(56) References Cited

U.S. PATENT DOCUMENTS

| | | | |
|---|---|---|---|
| 9,222,976 B1* | 12/2015 | Usgaonkar | G01R 31/3177 |
| 9,544,205 B2 | 1/2017 | Changdrayana et al. | |
| 9,602,437 B1 | 3/2017 | Bernath | |
| 2004/0226026 A1 | 11/2004 | Glass et al. | |
| 2009/0024969 A1 | 1/2009 | Changra | |
| 2010/0021745 A1 | 1/2010 | Simpson et al. | |
| 2012/0162234 A1 | 6/2012 | Blinzer et al. | |
| 2016/0269228 A1 | 9/2016 | Franke et al. | |
| 2018/0322081 A1* | 11/2018 | Breakstone | G06F 13/28 |
| 2019/0042512 A1* | 2/2019 | Patel | G06F 13/4068 |
| 2019/0138470 A1* | 5/2019 | Li | G06F 13/14 |
| 2019/0312772 A1* | 10/2019 | Zhao | G06F 9/5011 |

OTHER PUBLICATIONS

Kim et al., "Multi-GPU System Design with Memory Networks"; 2014 47th Annual IEEE/ACM International Symposium on Microarchitecture; Dec. 13-17, 2014, pp. 484-495.

Anonymously, "System and Method to Bias Workload Distribution around Uplink Constraints"; http://ip.com/IPCOM/000238591D; Sep. 4, 2014, 2 pages.

Li, et al., "Characterization of Input/Output Bandwidth Performance Models in NUMA Architecture for Data Intensive Applications"; Department of Electrical Engineering, Stony Brook University, Stony Brook, NY., tan.li@stonybrook.edu, Oct. 2013, 10 pages.

Anonymously; "Workload Optimization through Dynamic Reconfiguration of Compute Nodes"; http://ip.com/IPCOM/000215416D; Feb. 26, 2012, 3 pages.

* cited by examiner

RECONFIGURABLE NETWORK INFRASTRUCTURE

FIELD

This disclosure relates generally to high-speed workload processing architectures including multiple control processor units (CPU) and graphics processor units (GPU), and particularly to a novel method and system architecture to reconfigure GPUs with or without using high-speed switches to provide favorable latency and bandwidth based topologies to optimize and improve application workload performance.

BACKGROUND

Machine learning/deep learning workloads are utilizing GPUs to offload content and perform operations involving extremely-large amounts of data. The throughput of the interface between CPU and GPU as well as GPU to GPU is extremely significant and hence the latency is extremely important. Some current application workloads demand GPU to GPU traffic which is enabled by either a PCI-e switch, in case where the GPU's are endpoint, enabling peer-to-peer (P2P) traffic without the involvement of the CPU, or a separate high speed link between the GPU and the CPU.

Moreover, current architectures require a re-spin of hardware and a re-do of the low level software to support various workload requirements.

SUMMARY

There is provided a re-configurable system architecture and corresponding method for producing flexible and cost-sensitive network hardware topologies.

There is provided a re-configurable system architecture and corresponding method for producing flexible and cost-sensitive network architecture designs which are optimized for particular workloads.

A method and system architecture to reconfigure GPUs with or without the switches to design favorable latency and bandwidth hardware-based topologies to optimize workload to perform better.

In one aspect, there is provided a configurable hardware network architecture. The configurable hardware network architecture comprises: a printed circuit board (PCB) carrier having wired connections for routing signals between electronic devices, the electronic devices comprising multiple graphics processor units (GPUs) for carrying out first sets of operations; and at least one control processor units (CPUs) for carrying out second sets of operations; and a memory storage associated with one or more the CPUs and GPUs. A first CPU of the at least one CPUs having a first multiple the GPUs associated therewith; the first CPU having associated multiple one or more high-speed connectors for providing communications at a first byte speed, the high-speed connectors of the first CPU available for cable-connection at or near a surface of the PCB connections platform. Each of the first multiple the GPUs associated with the first CPU having an associated high-speed connector for providing communications at the first byte speed, the high-speed connectors of each the first multiple GPUs available for cable-connection at or near a surface of the PCB connections platform. The network architecture is configurable by directly connecting one or more first high speed interface cable links for communications at a first byte speed between a high-speed connector of the first CPU and a respective high-speed connector of an associated GPU of the first multiple GPUs, and/or by directly connecting using first high speed interface cable links one or more GPUs of the first multiple GPUs for communications at the first byte speed. The network topology is re-architected by providing different direct connections using the first high speed interface links based on a workload requirement.

In a further aspect, there is provided a method of configuring a hardware network architecture for running a workload. The method comprises: directly connecting one or more first high-speed interface cable links for communications at a first byte speed between a corresponding high-speed connector of a host central processing unit (CPU) on a printed circuit board (PCB) platform having wired connections for routing signals between electronic devices, and a respective high-speed connector of an associated graphics processing unit (GPU) of first multiple GPUs on the PCB platform, and/or directly connecting using first high speed interface cable links between connectors at one or more GPUs of the multiple GPUs for communications at the first byte speed; determining a hardware network topology based on the directly connected one or more first high-speed interface cable links between the CPU and GPUs and between GPUs of the multiple GPUs; running, using a controller, a workload run at a CPU using the determined hardware network topology. There is obtained, using the controller, a benchmark performance index for the hardware network topology based on running the workload; and based on the obtained benchmark performance index for the hardware network topology, re-configuring the hardware network topology by adding or subtracting one or more direct connected cable links between the CPU and GPU or between GPUs of the multiple GPUs.

In yet another aspect, there is provided a method of configuring a hardware network architecture for running a workload. The method comprises: directly connecting one or more first high-speed interface cable links for communications at a first byte speed between a corresponding high-speed connector of a host central processing unit (CPU) on a printed circuit board (PCB) platform having wired connections for routing signals between electronic devices, and a respective high-speed connector of an associated graphics processing unit (GPU) of first multiple GPUs on the PCB platform, and/or directly connecting using first high speed interface cable links between connectors at one or more GPUs of the multiple GPUs for communications at the first byte speed; determining, by a processor, a hardware network topology based on the directly connected one or more first high-speed interface cable links between the CPU and GPUs and between GPUs of the multiple GPUs; initiating, by the processor, a running of a boot process for initializing the determined hardware network topology configuration for running the workload; generating a system map specifying cable link connectivities of the hardware network topology; providing the generated system map to an application program to be run on the CPU, the application program using the system map for optimizing running of the workload on the connected topology.

In a further aspect, there is provided a computer program product for performing operations. The computer program product includes a storage medium readable by a processing circuit and storing instructions run by the processing circuit for running a method. The methods are the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

The present disclosure describes a system, method, and computer program product for reconfiguring a hardware network topology by connecting graphics processing units (GPUs) in a network topology on a single carrier or platform according to multiple different options.

The system, method and computer program products provide a method and system architecture to reconfigure GPU with or without the use of switches to design favorable latency and bandwidth based topologies to optimize workload performance.

Figure 1:
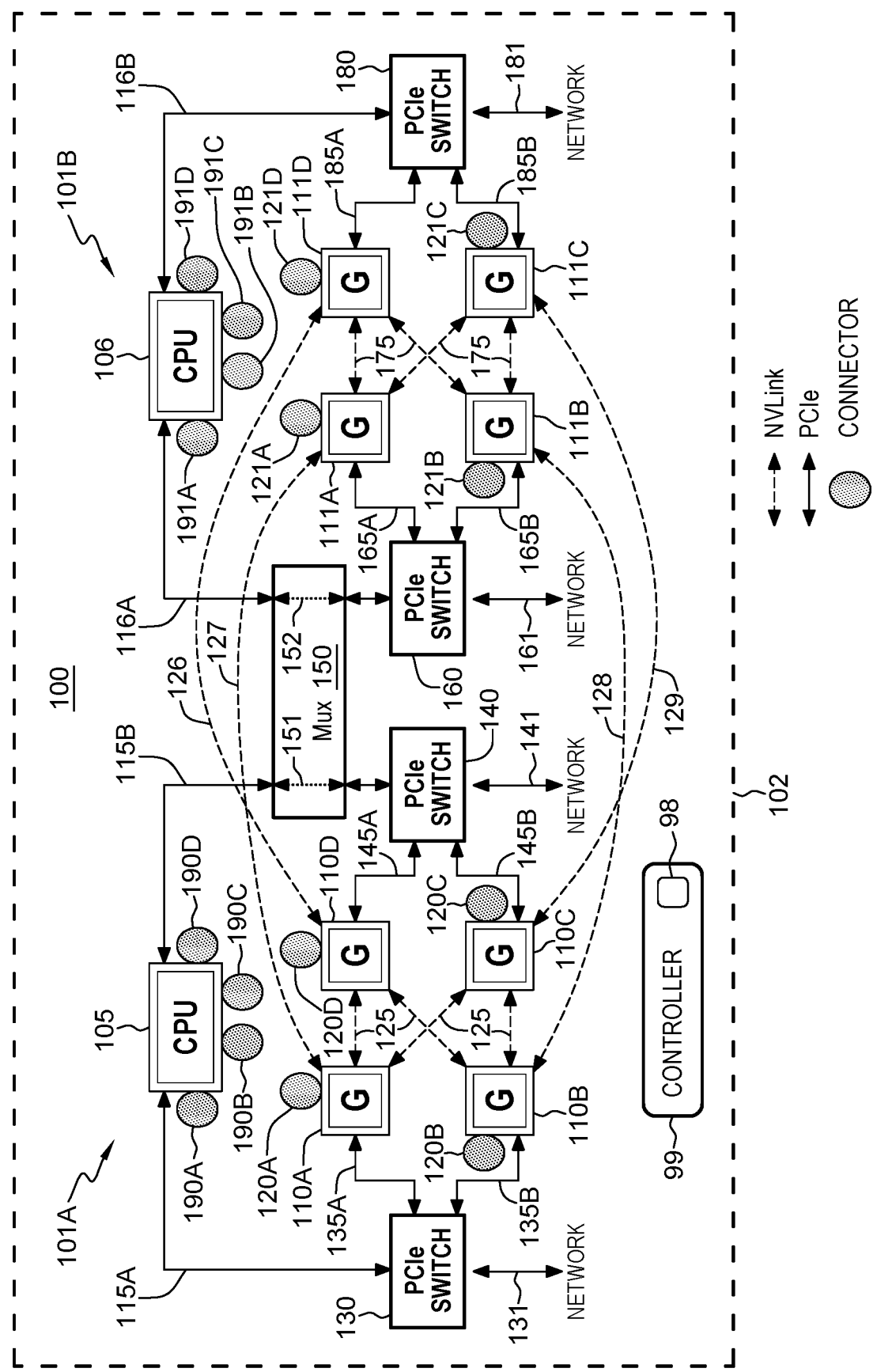
FIG. 1 shows an example configuration of a re-configurable network topology on a printed circuit board in one embodiment.

FIG. 1 shows an example configuration of a re-configurable network topology 100 included on a single carrier, e.g., a mother board or printed circuit board (PCB) 102, that includes two clusters 101A, 101B of electronic devices, each cluster including a CPU and a cluster of GPUs, e.g., four GPUs each GPU that can be used for graphics workloads, but are also used with a CPU(s) to carry out sets of operations to accelerate scientific, engineering and business software workloads. Although not shown, a GPU and CPU may be a processor node having its own associated memory, I/O, and networked connection.

The printed circuit board (PCB) 102 includes high-speed communication channels, wired connections, e.g., data bus lines, address bus lines, Input/Output (I/O) data lines, etc., and connectors for routing signals between GPUs of the GPU cluster or between a CPU and GPUs of the cluster along high-speed cable connections. One example of a high-speed cable is the wire-based NVLink® (reg. trademark of Nvidia Corp.) providing a communications protocol serial multi-lane near-range high-speed communication link. Such high speed links include dedicated high-bandwidth point-to-point channels, e.g., enabling data communications at least at, but not limited to, 25 GB/s for data and control code transfers in processor systems between CPUs and GPUs and between GPUs. As shown, the single carrier 102 (or portion thereof) includes at least two host central processing units (CPUs), e.g., a microprocessor 105 in cluster 101A and a single host CPU 106 in networking cluster 101B for carrying out respective control operations in each cluster for example. Cluster 101A further includes four graphics processing units (GPUs) 110A, . . . , 110D and cluster 101B also includes four graphics processing units (GPUs) 111A, . . . , 111D.

A further baseboard management controller or like control device 99 running boot code 98 for providing overall system boot operations for any network topology configured for running a workload using the reconfigurable architecture of FIG. 1 is also provided.

As further shown in FIG. 1, re-configurable network topology 100 further includes, at cluster 101A of the single mother board, a high-speed first Peripheral Component Interconnect Express (PCIe) Switch 130 for performing switching and point-to-point connection operations in network 100 and that includes dedicated high-speed PCIe serial communication connections (links) on or in the PCI board (i.e., PCIe channels with more limited bandwidth than NVlinks speed). PCIe switch 130 interfaces with an external high-speed network connection or memory via a PCI serial bus link 131 which can include a connection to a PCIe based NVME or Infiniband (IB) adapter (not shown). PCIe switch 130 includes on-board configurable PCIe serial connection 115A that connects the CPU 105 with switch 130. The switch 130 is further configurable to directly connect CPU 105 with GPUs 110A, 110B over respective dedicated high-speed PCIe serial communication links 135A, 135B.

Cluster 101A includes a second PCIe switch 140 for performing switching and point-to-point connecting operations in network 100 that includes a dedicated high-speed PCIe serial connection 141 to interface with another external high-speed network (not shown), and an on-board dedicated PCIe serial connection 115B to connect with the CPU 105. The switch is further configurable to directly connect CPU 105 with GPUs 110D, 110C over respective dedicated high-speed PCIe serial communication links 145A, 145B.

As further shown in FIG. 1, re-configurable network topology 100 further includes dedicated direct-direct high-speed GPU/CPU communication links 125 in or on the PCB 102 for connecting GPU's, and particularly, an on-board high-speed GPU/CPU communication links 125 directly connecting GPUs 110A and 110D, an on-board high-speed NVLink 125 directly connecting GPUs 110B and 110C, an on-board high-speed NVLink 125 directly connecting GPUs 110A and 110C and a high-speed GPU/CPU communication link 125 directly connecting GPUs 110B and 110D. As mentioned, an example of a high speed GPU/CPU communication link is NVlink or OPENCAPi (coherent accelerator processor interface).

Re-configurable network topology 100 further includes, at cluster 101B of the single mother board, a high-speed PCIe Switch 160 for performing switching and point-to-point connection operations in re-configurable network 100 and that includes an on-board dedicated high-speed PCIe serial connection 161 to interface with an external high-speed network (not shown). Further connected to PCIe switch 160 is a dedicated PCIe serial connection 116A to connect the switch 160 with the second CPU 106. The switch is further configurable to directly connect CPU 106 with GPUs 111A, 111B over respective dedicated high-speed PCIe serial communication links.

Cluster 101B includes a second PCIe switch 180 for performing switching and point-to-point connecting operations in network 100 that includes a dedicated high-speed PCIe serial connection 181 to interface with an external high-speed network (not shown). A dedicated PCIe serial connection 116B connects switch 180 with the CPU 106. The switch 180 is further configurable to directly connect CPU 106 with GPUs 111D, 111C over respective dedicated high-speed PCIe serial communication links 185A, 185B.

As further shown in FIG. 1, re-configurable network topology 100 further includes on-board dedicated direct-direct high-speed GPU/CPU communication links 175 for connecting GPU's, and particularly, a high-speed GPU/CPU communication link 175 directly connecting GPUs 111A and 111D, a high-speed GPU/CPU communication link 175 directly connecting GPUs 111B and 111C, a high-speed GPU/CPU communication link 175 directly connecting GPUs 111A and 111C and a high-speed GPU/CPU communication link 175 directly connecting GPUs 111B and 111D.

Additionally shown in FIG. 1 is the provision of multiplexor circuit 150 which is programmable to provide a first multiplexed connection 151 for connecting the CPU 105 to the PCIe Switch 140 in cluster 101A, e.g., through PCIe connection link 115B. Similarly, multiplexor circuit 150 is programmable to provide a second multiplexed connection 152 for connecting the CPU 106 to the high-speed PCIe Switch 160 in cluster 101B, e.g., through PCIe connection link 116A, to enable direct-direct communication with GPUs 111A, 111B over respective PCIe communication links.

As further shown in FIG. 1, reconfigurable network 100 further includes cross-cluster high-speed GPU/CPU communication links on or in PCB 102 for directly connecting a GPU of one cluster 101A to a corresponding GPU of another cluster 101B. For example, a dedicated cross-cluster high-speed GPU/CPU communication link 126 directly connects GPU 110A of cluster 101A to GPU 111A of cluster 101B; a dedicated cross-cluster high-speed GPU/CPU communication link 127 directly connects GPU 110D of cluster 101A to GPU 111D of cluster 101B; a dedicated cross-cluster high-speed high-speed GPU/CPU communication link 128 directly connects GPU 110B of cluster 101A to GPU 111B of cluster 101B; and dedicated cross-cluster high-speed GPU/CPU communication link 129 directly connects GPU 110C of cluster 101A to GPU 111C of cluster 101B.

Reconfigurability in network topology 100 is enabled by the provision of the physical high-speed GPU/CPU communication link (e.g., NVLink) connectors which are provided on the PCB platform 102 that enable direct point-to-point cabling (e.g. using high-speed GPU/CPU communication link cables and corresponding mating hardware connectors) for connecting two GPUs within a cluster or for connecting GPUs within a cluster to the CPU of that cluster. A network topology is re-architected based on a workload requirement by providing different direct connections using the high-speed GPU/CPU communication link cables connections that connect to respective high-speed connectors.

As shown in FIG. 1, for example, in one embodiment, each GPU 110A, . . . , 110D of cluster 101A has a respective physical high-speed GPU/CPU communication link connector 120A, . . . , 120D situated on the motherboard in a manner configured to enable high-speed GPU/CPU communication link connections using high-speed cable to a graphics processing unit in that cluster having a corresponding physical connector. Likewise, each GPU 111A, . . . , 111D of cluster 101B has a respective physical connector 121A, . . . , 121D situated on the motherboard 102 in a manner so as for directly connecting a high-speed cable to enable configurable high-speed GPU/CPU communication link connections to a graphics processing unit connector of a GPU within that cluster.

In the embodiment depicted in FIG. 1, the high-speed GPU/CPU communication links of the CPU 105 are shown unconnected.

In the embodiment depicted, the CPU 105 is shown having four associated high-speed connectors 190A, 190B, 190C and 190D which may be cabled to provide direct high-speed communications with a respective physical high-speed GPU/CPU communication link connector 120A, . . . , 120D of GPUs 110A, . . . , 110D of the cluster 101A at or near a surface of the PCB connections platform 102. Similarly, the CPU 106 is shown having four associated high-speed connectors 191A, 191B, 191C and 191D which may be cabled to provide direct high-speed communications with a respective physical high-speed GPU/CPU communication link cable connector 121A, . . . , 121D of respective GPUs 111A, . . . , 111D of the cluster 101B at or near a surface of the PCB connections platform 102.

Figure 2:
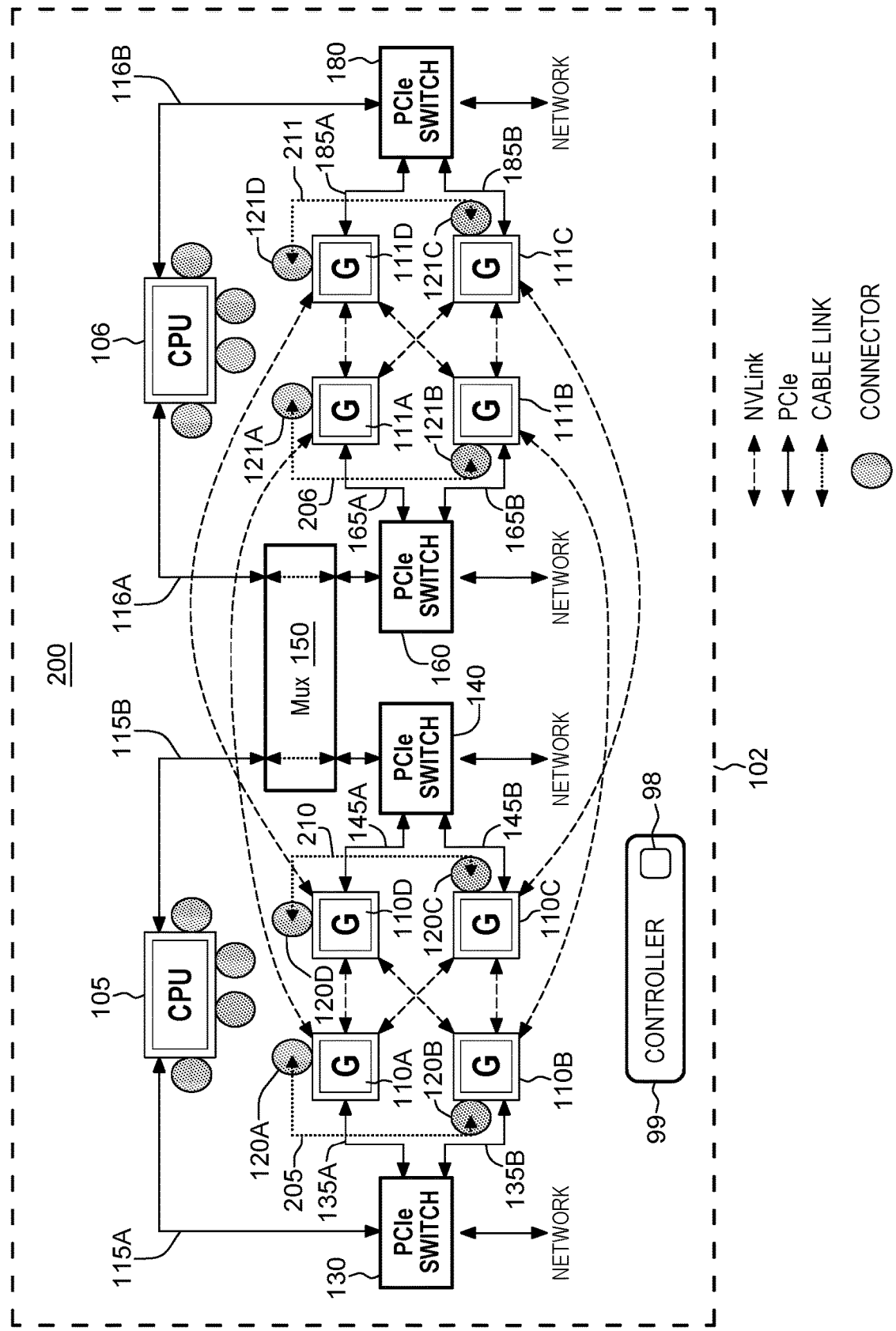
FIG. 2 depicts an example re-configured network topology corresponding to the base network architecture of FIG. 1.

FIG. 2 depicts an example re-configured network topology 200 corresponding to the base network architecture of FIG. 1. In the example network topology 200, there is provided an additional high speed GPU/CPU communication link cable connection 205 connected at one end to connector 120A of GPU 110A and at the other end to connector 120B of GPU 110B of cluster 101A enabling high-speed data transfers between GPUs 110A, 110B. In an embodiment, besides conducting data transfer between GPUs 110A, 110B via a connected high-speed GPU/CPU communication link 205, PCIe switch 130 is configurable to provide an additional parallel coherent or sideband links that increase bandwidth for enabling data transfer between GPU components 110A, 110B in parallel with high-speed GPU/CPU communication link 205 by serially connecting PCIe channels 135A, 135B via connecting ports of switch 130. Alternatively, or in addition, in a further embodiment, an additional high speed high-speed GPU/CPU communication link cable connection 210 may be added to connect at one end to connector 120D of GPU 110D and at the other end to connector 120C of GPU 110C of cluster 101A enabling high-speed data transfers between GPUs 110C, 110D. In an embodiment, besides conducting data transfer between GPUs 110D, 110C via a connected high-speed cable, e.g., NVlink 210, PCIe switch 130 is configurable to provide an additional parallel coherent link to increase bandwidth for enabling data transfer between GPU components 110D, 110C in parallel with NVlink 210 by serially connecting PCIe channels 145A, 145B via connecting ports of switch 140.

FIG. 2 further depicts, in the example network topology 200, alternative or additional embodiments, that provide a high-speed GPU/CPU communication link cable connection 206 at one end to connector 121A of GPU 111A and at the other end to connector 121B of GPU 111B of cluster 101B to enable a direct high-speed point-to-point connection enabling high-speed data transfers between these two GPUs 111A, 111B. In an embodiment, besides conducting data transfer between GPUs 111A, 111B via a connected high-speed GPU/CPU communication link 206, PCIe switch 160 is configurable to provide an additional parallel sideband link to increase bandwidth for enabling data transfer between GPU components 111A, 111B in parallel with NVlink 206 by serially connecting PCIe channels 165A, 165B via connecting ports of switch 160. Alternatively, or in addition, in a further embodiment, an additional high-speed GPU/CPU communication link cable connection 211 may be added to connect at one end to connector 121D of GPU 111D and at the other end to connector 121C of GPU 111C of cluster 101B enabling high-speed data transfers between GPUs 111C, 111D. In an embodiment, besides conducting data transfer between GPUs 111D, 111C via a connected high-speed GPU/CPU communication link 211, PCIe switch 180 is configurable to provide an additional parallel coherent link to increase bandwidth for enabling data transfer between GPU components 111D, 111C in parallel with high-speed GPU/CPU communication link 211 by serially connecting PCIe channels 185A, 185B via connecting ports of switch 180.

In the embodiment depicted in FIG. 2, the high-speed GPU/CPU communication links of the CPU 105 may remain unconnected.

Figure 3:
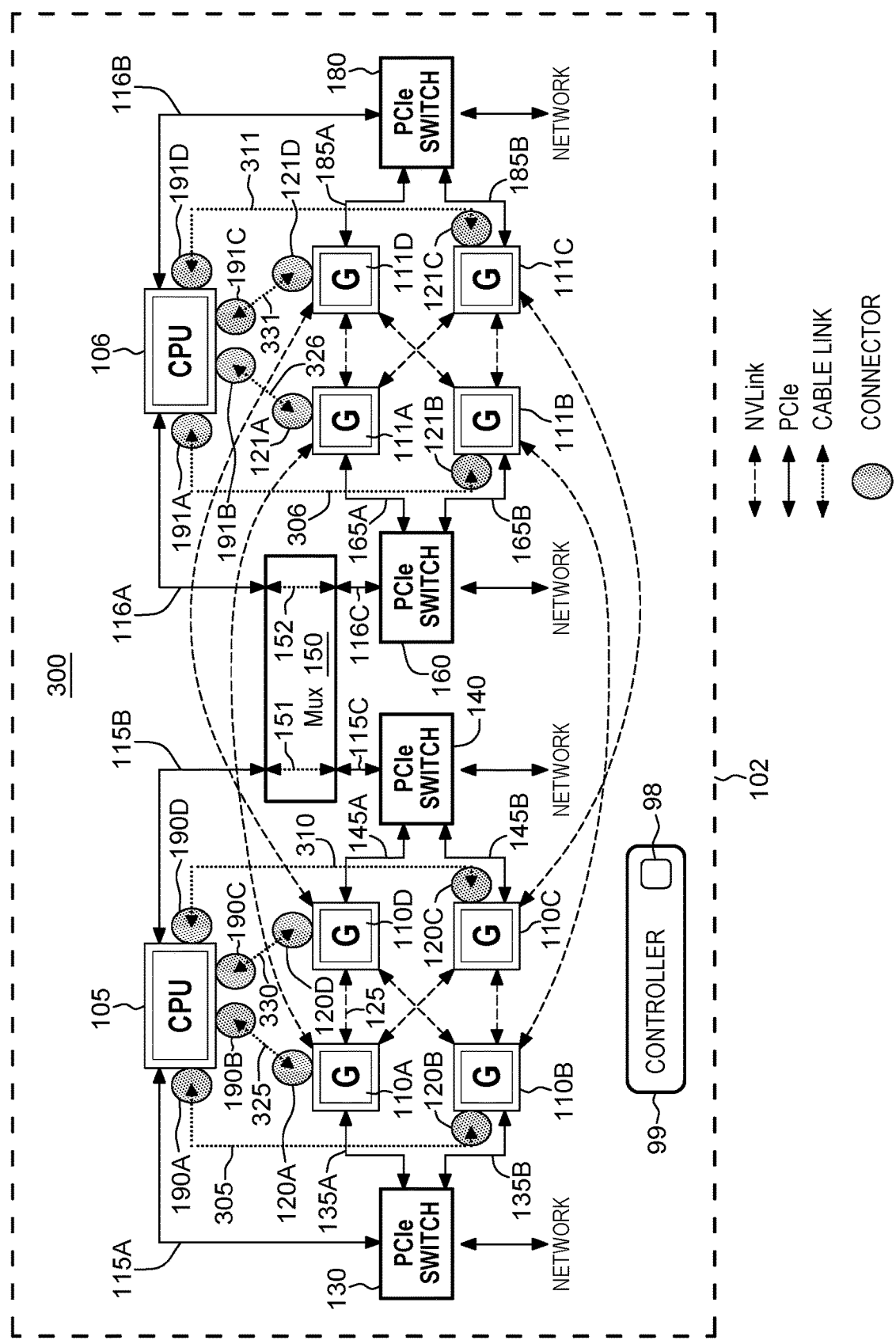
FIG. 3 depicts a further example for configuring a network topology corresponding to the base network architecture of FIG. 1.

FIG. 3 depicts an example re-configured network topology 300 corresponding to the base network architecture of FIG. 1, however showing additional high-speed GPU/CPU communication link cable connection 305 connected at one end to connector 190A of CPU 105 and at the other end to connector 120B of GPU 110B of cluster 101A enabling high-speed data transfers between CPU 105 and GPU 110B. In an embodiment, besides conducting data transfer between CPU 105 and GPU 110B via a connected high-speed GPU/CPU communication link 305, PCIe switch 130 is configurable to provide an additional parallel coherent link to increase bandwidth for enabling further high-speed data transfer between CPU 105 and GPU 110B components in parallel with high-speed GPU/CPU communication link 305 by serially connecting PCIe channels 115A and 135B via connecting ports of switch 130. Alternatively, or in addition, in a further embodiment, an additional high-speed GPU/CPU communication link cable connection 310 may be added to connect at one end to connector 190D of CPU 105 and at the other end to connector 120C of GPU 110C of cluster 101A enabling high-speed data transfers between CPU 105 and GPU 110C. In an embodiment, besides conducting data transfer between CPU 105 and GPU 110C via a connected high-speed cable connection 310, both PCIe switch 140 and multiplexor 150 are configurable to provide an additional parallel sideband link to increase bandwidth for enabling high-speed PCIe data transfer between CPU 105 and GPU 110C in parallel with high-speed GPU/CPU communication link 310. To configure this additional parallel sideband link, the multiplexor 150 is activated to provide a serial connection at 151 between PCIe channel 115B and a PCIe channel 115C between the multiplexor 150 and switch 140. The switch 140 is activated to provide a high-speed PCIe serial connection between the channel 115C and the channel 145B via connecting ports of switch 140 with connections 115B, 151, 115C and 145B established to form the sideband link to increase bandwidth for conducting additional parallel data transfer between CPU 105 and GPU 110C.

In alternate or additional embodiment, FIG. 3 depicts an additional high-speed GPU/CPU communication link cable connection 325 connected at one end to connector 190B of CPU 105 and at the other end to connector 120A of GPU 110A of cluster 101A enabling high-speed data transfers between CPU 105 and GPU 110A. In an embodiment, besides conducting direct high-speed data transfers between CPU 105 and GPU 110A via a connected high-speed GPU/CPU communication link 325, PCIe switch 130 is configurable to provide an additional parallel coherent link to increase bandwidth for enabling further high-speed data transfer between CPU 105 and GPU 110A components in parallel with high-speed GPU/CPU communication link 325 by activating PCIe switch 130 to serially connect PCIe channels 115A and 135A via connecting ports of switch 130.

In alternate or additional embodiment, FIG. 3 depicts an additional high-speed GPU/CPU communication link cable connection 330 connected at one end to connector 190C of CPU 105 and at the other end to connector 120D of GPU 110D of cluster 101A enabling high-speed data transfers between CPU 105 and GPU 110D. In an embodiment, besides conducting data transfer between CPU 105 and GPU 110D via a connected high-speed cable 330, both PCIe switch 140 and multiplexor 150 are configurable to provide an additional parallel sideband link to increase bandwidth for enabling high-speed PCIe data transfer between CPU 105 and GPU 110D in parallel with high-speed GPU/CPU communication link 330. To configure this additional parallel side-band link, the multiplexor 150 is activated to provide a serial connection at 151 between PCIe channel 115B and a PCIe channel 115C between the multiplexor 150 and switch 140. The switch 140 is activated to provide a high-speed PCIe serial connection between the channel 115C and the channel 145A via connecting ports of switch 140 with connections 115B, 151, 115C and 145A established to form the side-band link for conducting additional parallel data transfer between CPU 105 and GPU 110D.

FIG. 3 depicts in a further example re-configured network topology 300 corresponding to the base network architecture of FIG. 1, however showing additional or alternative high-speed GPU/CPU communication link cable connection 306 connected at one end to connector 191A of CPU 106 and at the other end to connector 121B of GPU 111B of cluster 101B enabling high-speed data transfers between CPU 106 and GPU 111B. In an embodiment, besides conducting data transfer between CPU 106 and GPU 111B via a connected high-speed GPU/CPU communication link 306, both PCIe switch 160 and multiplexor 150 are configurable to provide an additional parallel side-band link for enabling high-speed PCIe data transfer between CPU 106 and GPU 111B in parallel with high-speed GPU/CPU communication link 306. To configure this additional parallel side-band link, the multiplexor 150 is activated to provide a serial connection at 152 between PCIe channel 116A and a PCIe channel 116C between the multiplexor 150 and switch 160. The switch 160 is activated to provide a high-speed PCIe serial connection between the channel 116C and the channel 165B via connecting ports of switch 160 with connections 116A, 152, 116C and 165B established to form the side-band link for conducting additional parallel data transfer between CPU 105 and GPU 111B.

Alternatively, or in addition, in a further embodiment, an additional high-speed GPU/CPU communication link cable connection 311 may be added to connect at one end to connector 191D of CPU 106 and at the other end to connector 121C of GPU 111C of cluster 101B enabling high-speed data transfers between CPU 106 and GPU 111C. In an embodiment, besides conducting data transfer between CPU 106 and GPU 111C via a connected high-speed GPU/CPU communication link 311, PCIe switch 180 is configurable to provide an additional parallel side-band link for enabling further high-speed data transfer between CPU 106 and GPU 111C components in parallel with high-speed GPU/CPU communication link 311 by activating PCIe switch 180 to serially connect PCIe channels 116B and 185B via connecting ports of switch 180.

In alternate or additional embodiment, FIG. 3 depicts an additional high-speed GPU/CPU communication link cable connection 326 connected at one end to connector 191B of CPU 106 and at the other end to connector 121A of GPU 111A of cluster 101B enabling high-speed data transfers between CPU 106 and GPU 111A. In an embodiment, besides conducting data transfer between CPU 106 and GPU 111A via a connected high-speed GPU/CPU communication link 326, both PCIe switch 160 and multiplexor 150 are configurable to provide an additional parallel side-band link for enabling high-speed PCIe data transfer between CPU 106 and GPU 111A in parallel with high-speed GPU/CPU communication link 326. To configure this additional parallel side-band link, the multiplexor 150 is activated to provide a serial connection at 152 between PCIe channel 116A and a PCIe channel 116C between the multiplexor 150 and switch 160. The switch 160 is activated to provide a high-speed PCIe serial connection between the channel 116C and the channel 165A via connecting ports of switch 160 with connections 116A, 152, 116C and 165A established to form the side-band link for conducting additional parallel data transfer between CPU 106 and GPU 111A.

In alternate or additional embodiment, FIG. 3 depicts an additional high speed high-speed GPU/CPU communication link cable connection 331 connected at one end to connector 191C of CPU 106 and at the other end to connector 121D of GPU 111D of cluster 101B enabling high-speed data transfers between CPU 106 and GPU 111D. In an embodiment, besides conducting direct high-speed data transfers between CPU 106 and GPU 111D via a connected high-speed cable high-speed GPU/CPU communication link 331, PCIe switch 180 is configurable to provide an additional parallel side-band link for enabling further high-speed data transfer between CPU 106 and GPU 111D components in parallel with high-speed GPU/CPU communication link 331 by activating PCIe switch 180 to serially connect PCIe channels 116B and 185A via connecting ports of switch 180.

Figure 4:
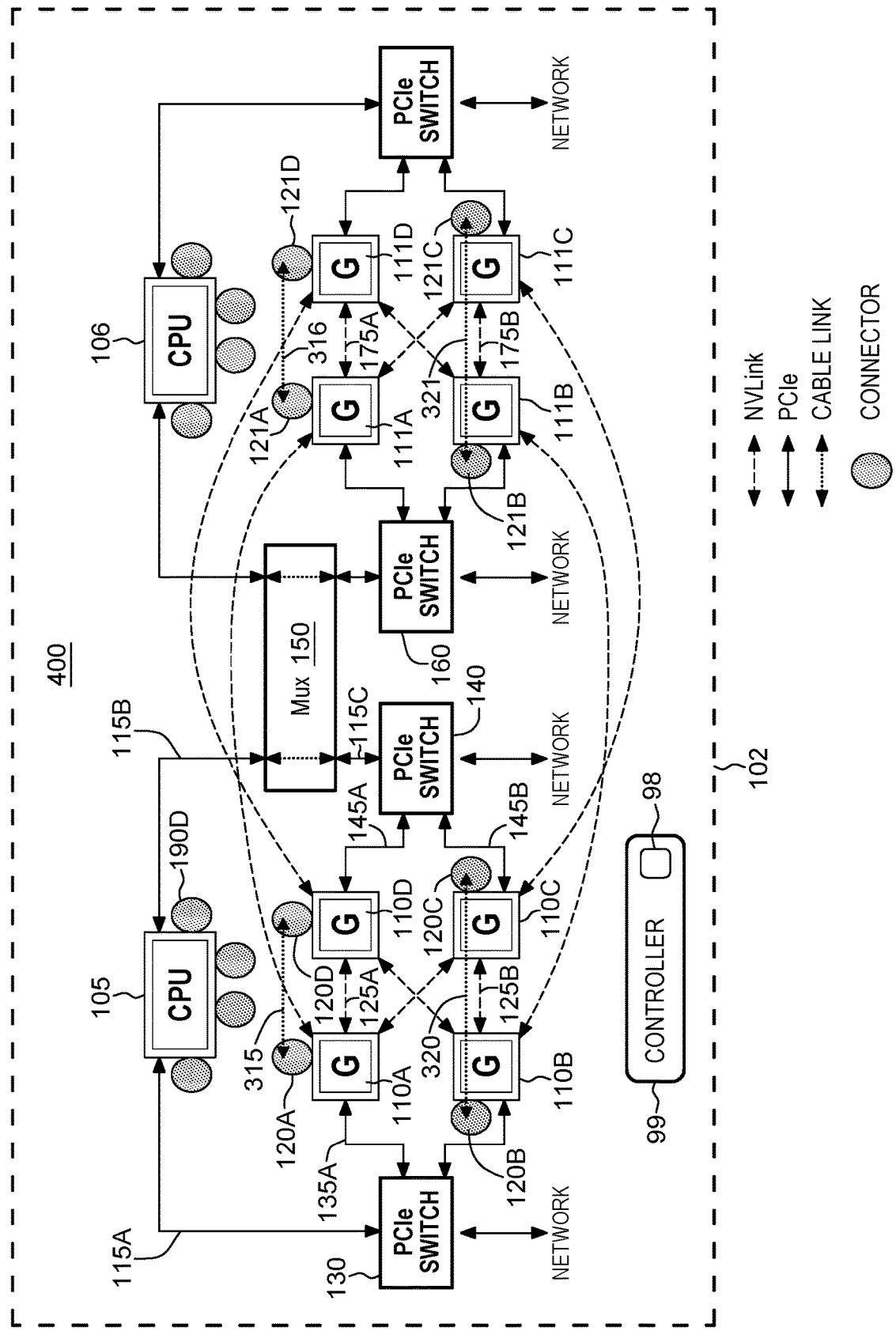
FIG. 4 depicts an example re-configured network topology corresponding to the base re-configurable network architecture of FIG. 1.

FIG. 4 depicts an example re-configured network topology 400 corresponding to the base network architecture of FIG. 1, however showing additional high-speed GPU/CPU communication link cable connection 315 connected at one end to connector 120A of GPU 110A and at the other end to connector 120D of GPU 110D of cluster 101A enabling additional high-speed data transfers between GPU 110A and GPU 110D. This can constitute a side-band high-speed NVlink cable connection in parallel with on-board dedicated high-speed GPU/CPU communication link 125A enabling data transfers between GPU 110A and GPU 110D.

In a further alternative or additional embodiment, the network topology 400 may be re-configured to include a further high-speed GPU/CPU communication link cable connection 320 connected at one end to connector 120B of GPU 110B and at the other end to connector 120C of GPU 110C of cluster 101A enabling additional high-speed data transfers between GPU 110B and GPU 110C. This can constitute a side-band high-speed GPU/CPU communication link cable connection in parallel with on-board dedicated high-speed GPU/CPU communication link 125B enabling further data transfers between GPU 110B and GPU 110C.

In the further example re-configured network topology 400 of FIG. 4, it is possible to further provide an additional high-speed GPU/CPU communication link cable connection 316 connected at one end to connector 121A of GPU 111A and at the other end to connector 121D of GPU 111D of cluster 101B enabling additional high-speed data transfers between GPU 111A and GPU 111D. This can constitute a side-band or coherent high-speed GPU/CPU communication link cable connection in parallel with on-board dedicated high-speed GPU/CPU communication link 175A enabling parallel data transfers between GPU 111A and GPU 111D.

In a further alternative or additional embodiment, the network topology 400 may be re-configured to include a further high-speed GPU/CPU communication link cable connection 321 connected at one end to connector 121B of GPU 111B and at the other end to connector 121C of GPU 111C of cluster 101B enabling additional high-speed data transfers between GPU 111B and GPU 111C. This can constitute a side-band or a coherent high-speed GPU/CPU communication link cable connection in parallel with on-board dedicated high-speed GPU/CPU communication link 175B enabling further data transfers between GPU 111B and GPU 111C.

Figure 5:
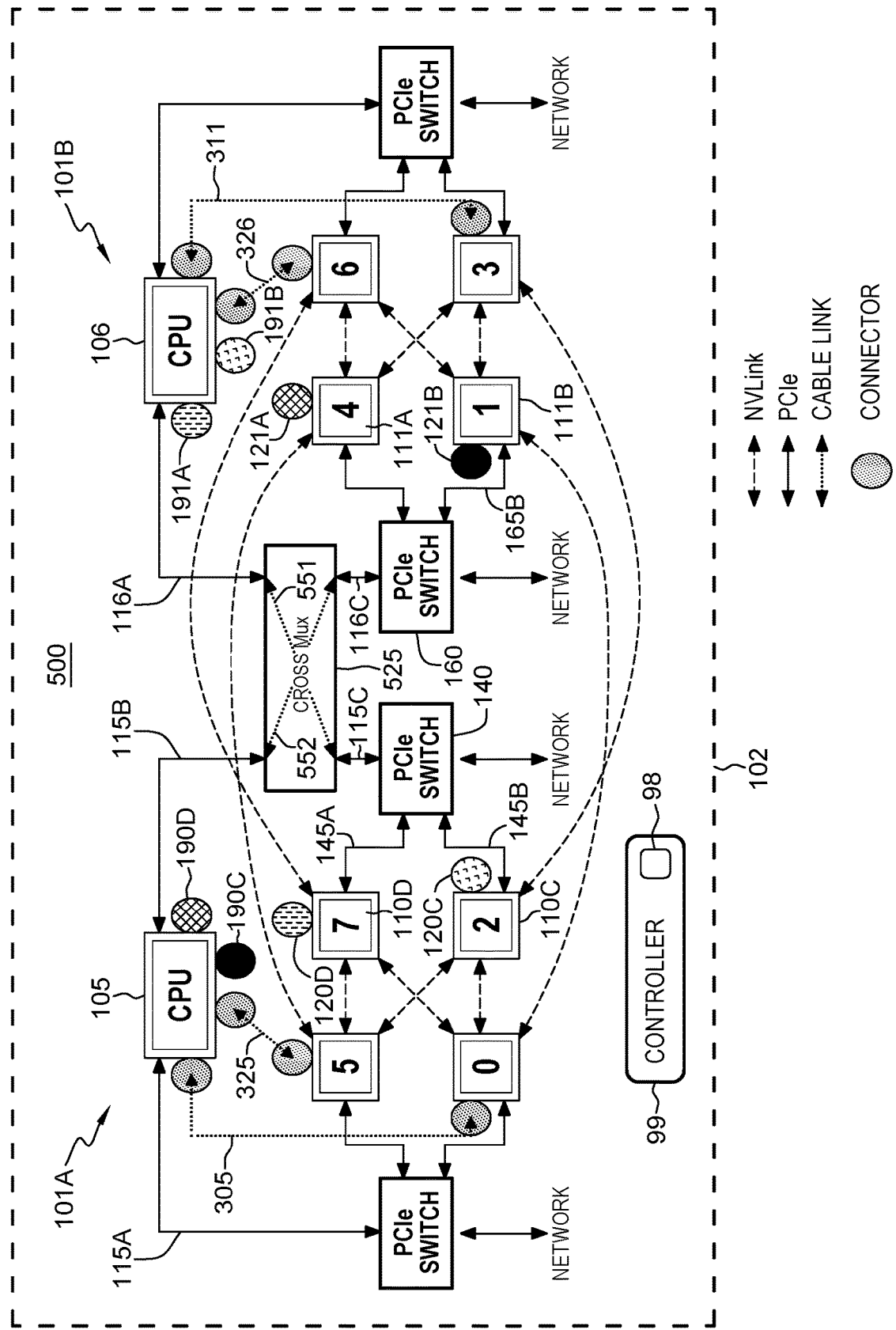
FIG. 5 illustrates a further embodiment of a configurable network topology infrastructure employing a cross-switching multiplexor for connecting two GPU clusters.

FIG. 5 illustrates a further embodiment of a configurable network topology infrastructure 500 in which the multiplexor may include a cross-switching multiplexor. The embodiment of FIG. 5 includes the same CPU and GPU clusters of devices and respective high-speed GPU/CPU communication links, e.g., high-speed Nvidia® NVLink connectors. In FIG. 5 are depicted examples of various configurations of direct high-speed GPU/CPU communication link connections enabling data transfers between a processing device of cluster 101A and a processing device of cluster 101B. The use of cross-multiplexing switch 525 permits additional high-speed PCIe direct side-band links between the connected elements.

For example, one configurable direct connection can include a high-speed GPU/CPU communication link cable connection (not shown) between connector 190D of CPU 105 and connector 121A of GPU 111A of cluster 101B to enable high-speed data transfer between those elements. A corresponding side-band link may be formed by activating PCIe switch 160 and cross-switching multiplexor 525 to enable a direct connection of PCIe channels between GPU 111A and CPU 105 including the activating of switch 160 for connecting of PCIe channels 165A and 116C and the activating of cross-switching multiplexor 525 for connecting link 116C and 115B connections through multiplexed connection 552.

Another configurable direct connection can include a high-speed GPU/CPU communication link cable connection (not shown) between connector 191B of CPU 106 and connector 120C of GPU 110C of cluster 101A to enable high-speed data transfer between those elements. A corresponding side-band link parallel to this connection may be formed by activating PCIe switch 140 and cross-switching multiplexor 525 to enable a direct connection of PCIe channels between GPU 110C and CPU 106 including the activating of PCIe switch 140 for connecting of PCIe channels 145B and 115C and the activating of cross-switching multiplexor 525 for connecting link 115C and 116A connections through multiplexed connection 551.

Another configurable direct connection can include a high-speed GPU/CPU communication link cable connection (not shown) between connector 191A of CPU 106 and connector 120D of GPU 110D of cluster 101A to enable high-speed data transfer between those elements. A corresponding side-band link parallel to this connection may be formed by activating PCIe switch 140 and cross-switching multiplexor 525 to enable a direct connection of PCIe channels between GPU 110D and CPU 106 including the activating of switch 140 for connecting of PCIe channels 145A and 115C and the activating of cross-switching multiplexor 525 for connecting link 115C and 116A connections through multiplexed connection 551.

Another configurable direct connection can include a high-speed GPU/CPU communication link cable connection (not shown) between cable connector 190C of CPU 105 and connector 121B of GPU 111B of cluster 101B to enable high-speed data transfer between those elements. A corresponding side-band link parallel to this connection may be formed by activating PCIe switch 160 and cross-switching multiplexor 525 to enable a direct connection of PCIe channels between GPU 111B and CPU 105 including the activating of switch 160 for connecting of PCIe channels 165B and 116C and the activating of cross-switching multiplexor 525 for connecting link 116C and 115B connections through multiplexed connection 552.

Figure 6:
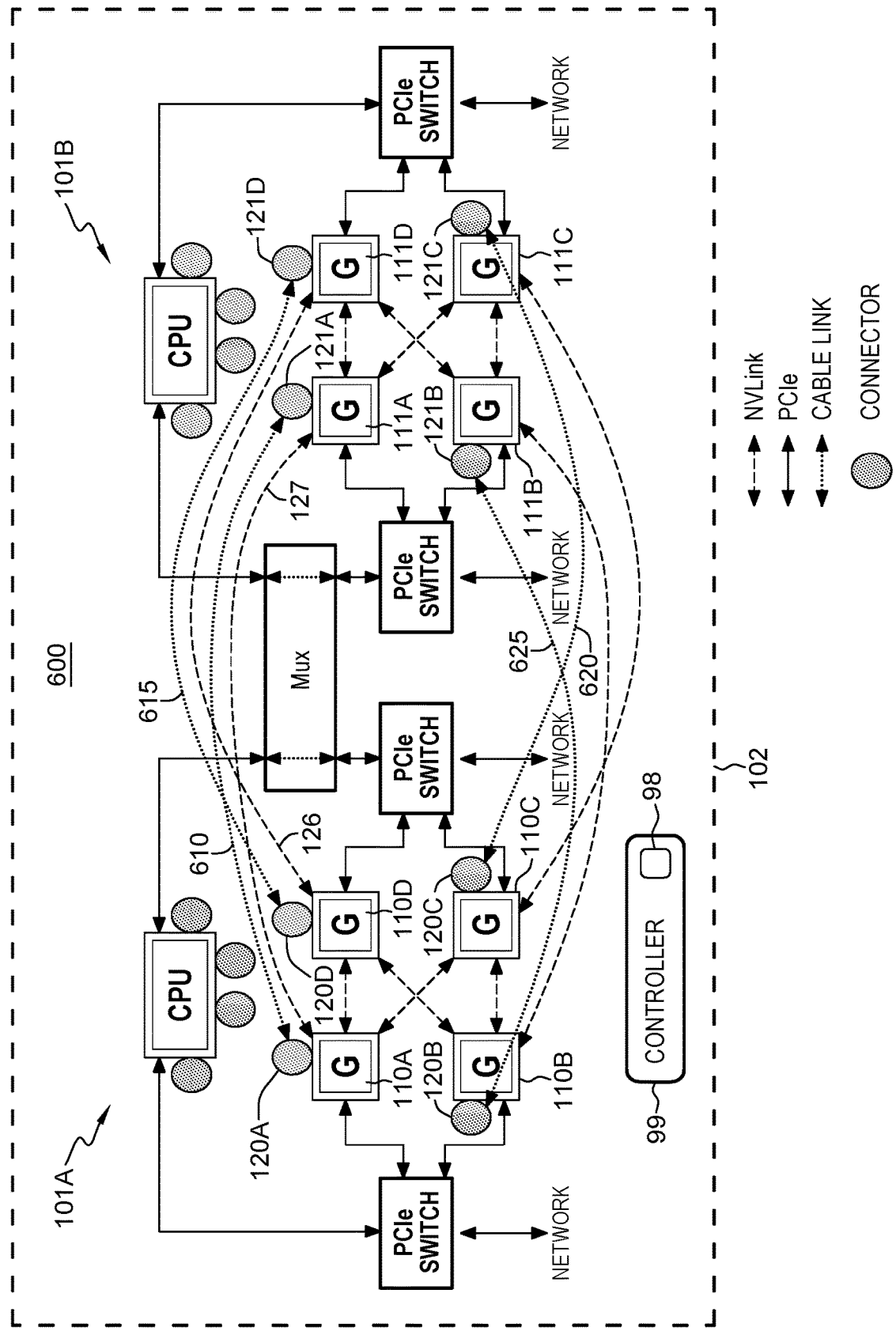
FIG. 6 illustrates further embodiments for configuring a network topology infrastructure using the architecture of FIG. 1.

FIG. 6 illustrates further embodiments of a configurable network topology infrastructure 600. FIG. 6 corresponds to the embodiments of FIG. 1, including the same CPU and GPU clusters of devices and respective on-board high-speed GPU/CPU communication link connectors. In FIG. 6 are depicted further examples of various configurations of direct high-speed GPU/CPU communication link cable connections enabling high-speed data transfers between a processing device of cluster 101A and a processing device of cluster 101B.

For example, one configurable direct connection can include a high-speed GPU/CPU communication link cable 610 connected between connector 120A of GPU 110A in cluster 101A and high-speed GPU/CPU communication link cable connector 121A of GPU 111A in cluster 101B. Similarly, a configurable direct high-speed connection can include a high-speed GPU/CPU communication link cable connection 615 between connector 121D of GPU 111D in cluster 101B and high-speed GPU/CPU communication link cable connector 120D of GPU 110D in cluster 101A. Similarly, a configurable direct high-speed connection can include a high-speed GPU/CPU communication link cable connection 620 between connector 121C of GPU 111C in cluster 101B and a high-speed GPU/CPU communication link cable connector 120C of GPU 110C in cluster 101A. Further, a configurable direct high-speed connection can include a high-speed GPU/CPU communication link cable connection 625 between connector 121B of GPU 111B in cluster 101B and a high-speed GPU/CPU communication link cable connector 120B of GPU 110B in cluster 101A.

Figure 7:
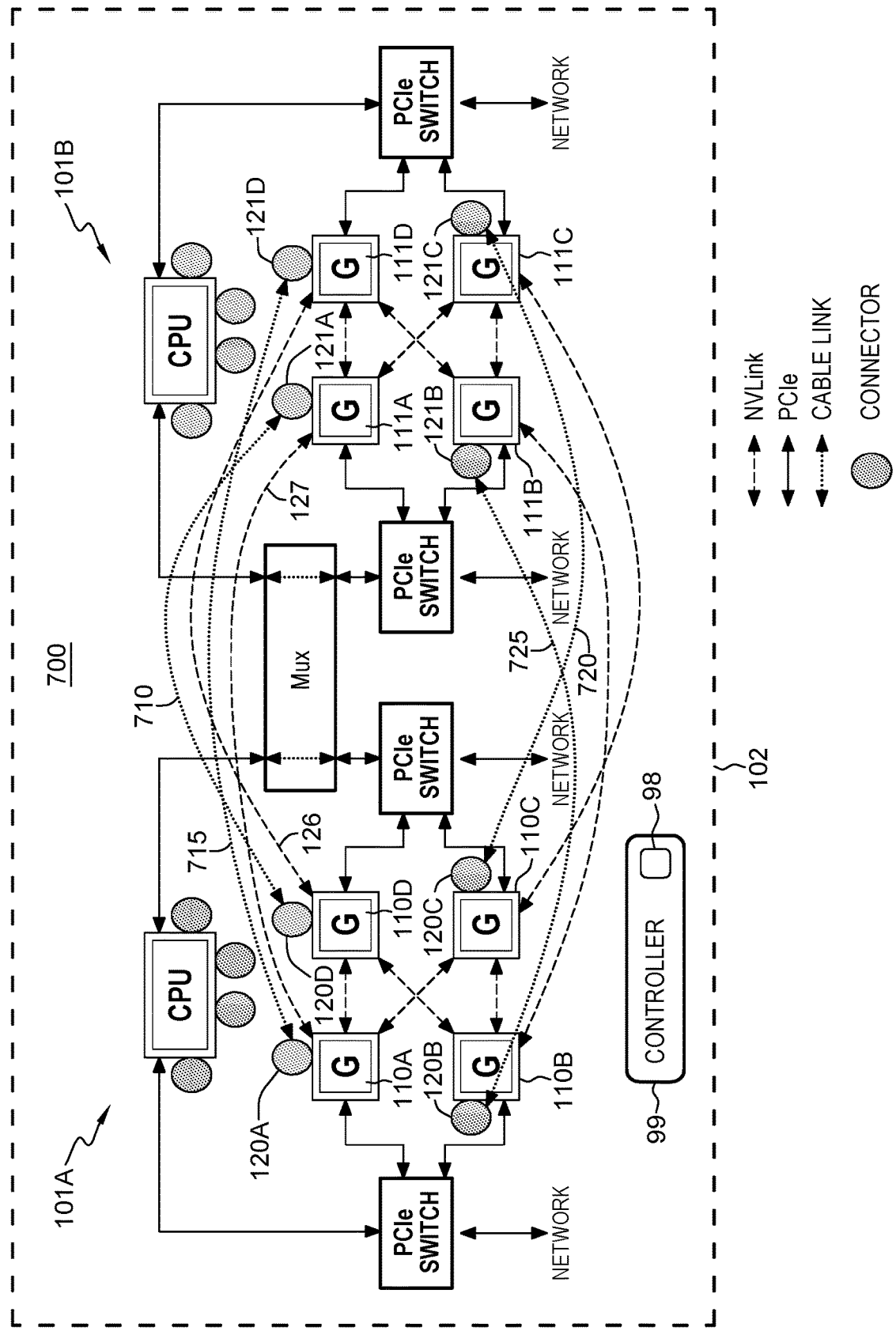
FIG. 7 illustrates even further embodiments for configuring a network topology infrastructure using the architecture of FIG. 1.

FIG. 7 illustrates further embodiments of a configurable network topology infrastructure 700. FIG. 7 corresponds to the embodiments of FIG. 1, including the same CPU and GPU clusters of devices and respective on-board high-speed GPU/CPU communication link connectors. In FIG. 7 are depicted further examples of various configurations of direct high-speed GPU/CPU communication link cable connections enabling high-speed data transfers between a processing device of cluster 101A and a processing device of cluster 101B.

For example, one configurable direct connection can include a high-speed GPU/CPU communication link cable 710, e.g., an NVLink, connected between connector 120D of GPU 110D in cluster 101A and NVLink cable connector 121A of GPU 111A in cluster 101B. Similarly, a configurable direct high-speed connection can include a high-speed GPU/CPU communication link cable connection 715 between connector 121D of GPU 111D in cluster 101B and high-speed GPU/CPU communication link cable connector 120A of GPU 110A in cluster 101A. Similarly, a configurable direct high-speed connection can include an NVLink cable connection 720 between connector 121C of GPU 111C in cluster 101B and a high-speed GPU/CPU communication link, e.g., NVLink, cable connector 120C of GPU 110C in cluster 101A. Further, a configurable direct high-speed connection can include an NVLink cable connection 725 between connector 121B of GPU 111B in cluster 101B and NVLink cable connector 120B of GPU 110B in cluster 101A.

Figure 8A:
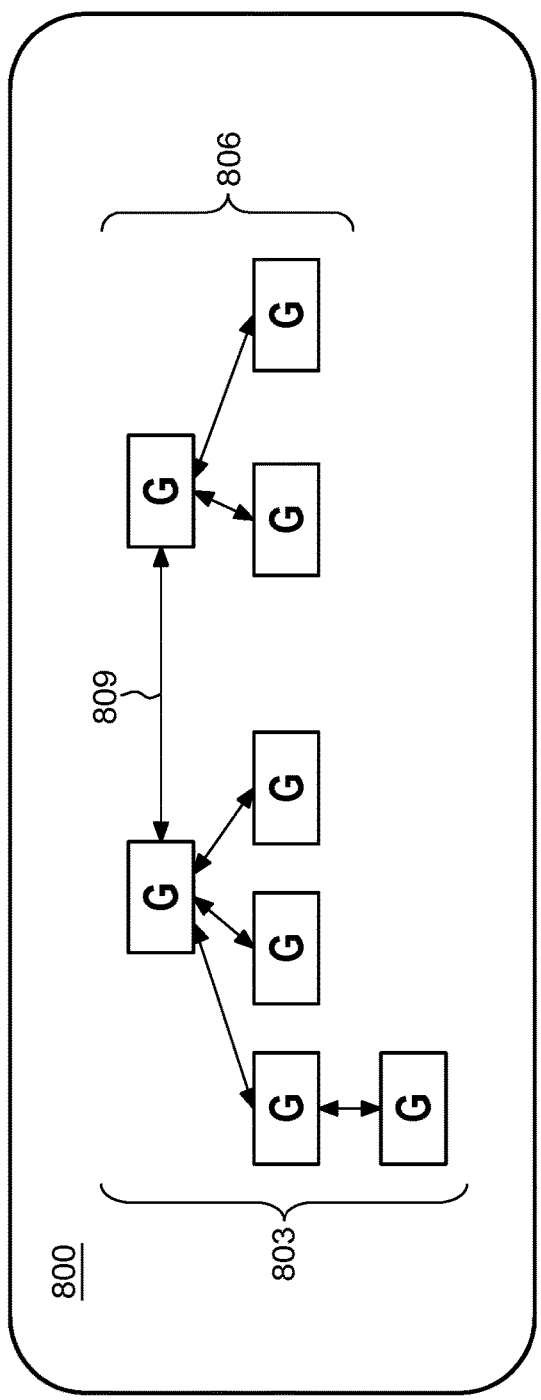
FIGS. 8A-8D depict various GPU data transfer topology architectures using the re-configurable network architecture of FIGS. 1-7.

FIGS. 8A-8D depict various GPU data transfer topology architectures using the re-configurable network architectures of the embodiments depicted in FIGS. 1-7. In one embodiment, shown in FIG. 8A is an example network topology configuration 800 of high-speed GPU clusters configured as two branches 803, 806 with each branch having a top node interconnected by a high-speed GPU/CPU communication link channel 809.

Figure 8B:
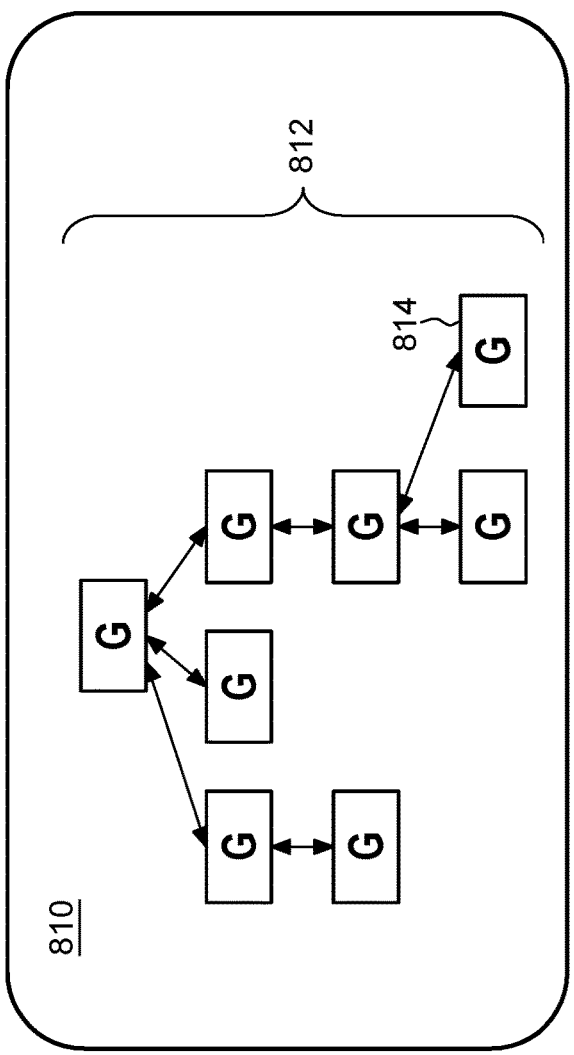

Shown in FIG. 8B is an example network topology configuration 810 of a high-speed GPU cluster configured with a single main branch 812 of serially connected GPU nodes with one GPU node having a high-speed GPU/CPU communication link, e.g., NVLink high-speed connection, to one child GPU node 814.

Figure 8C:
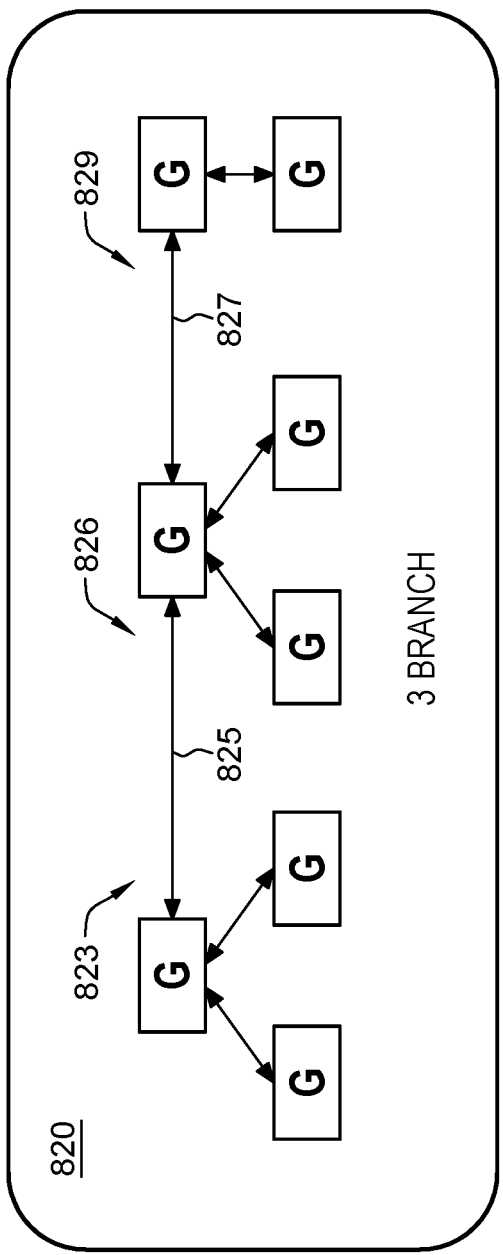

Shown in FIG. 8C is an example network topology configuration 820 of a high-speed GPU clusters configured as three branches 823, 826, 829 of GPUs with each branch having a top node connected to an adjacent top node of each branch, e.g., using two high-speed GPU/CPU communication channels 825, 827.

Figure 8D:
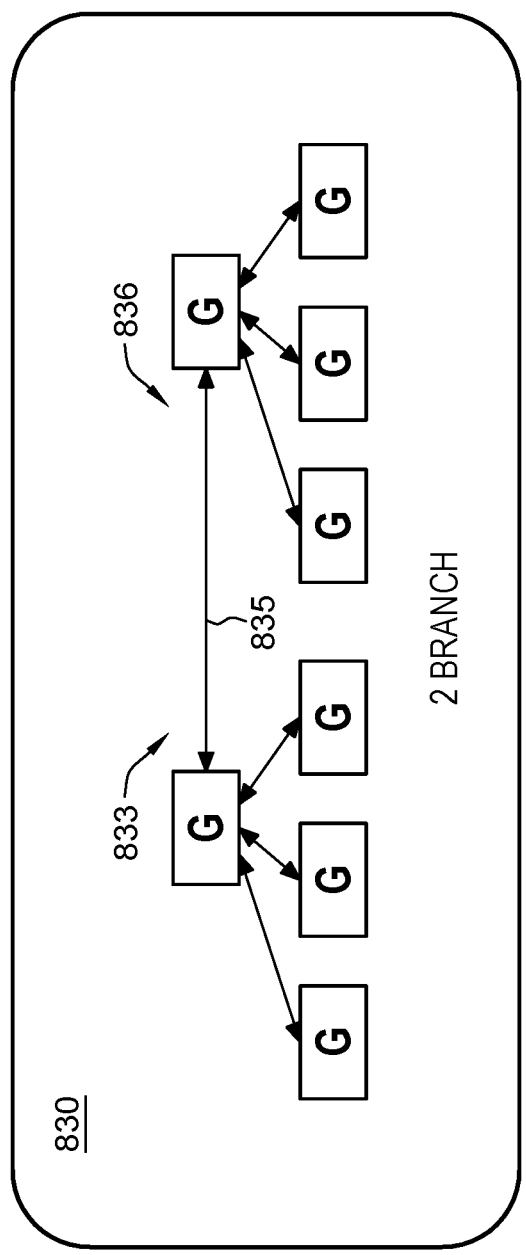

Shown in FIG. 8D is an example network topology configuration 830 of a high-speed GPU clusters configured as two branches 833, 836 with each branch having a top node connected by a high-speed GPU/CPU communication link 835.

Figure 9A:
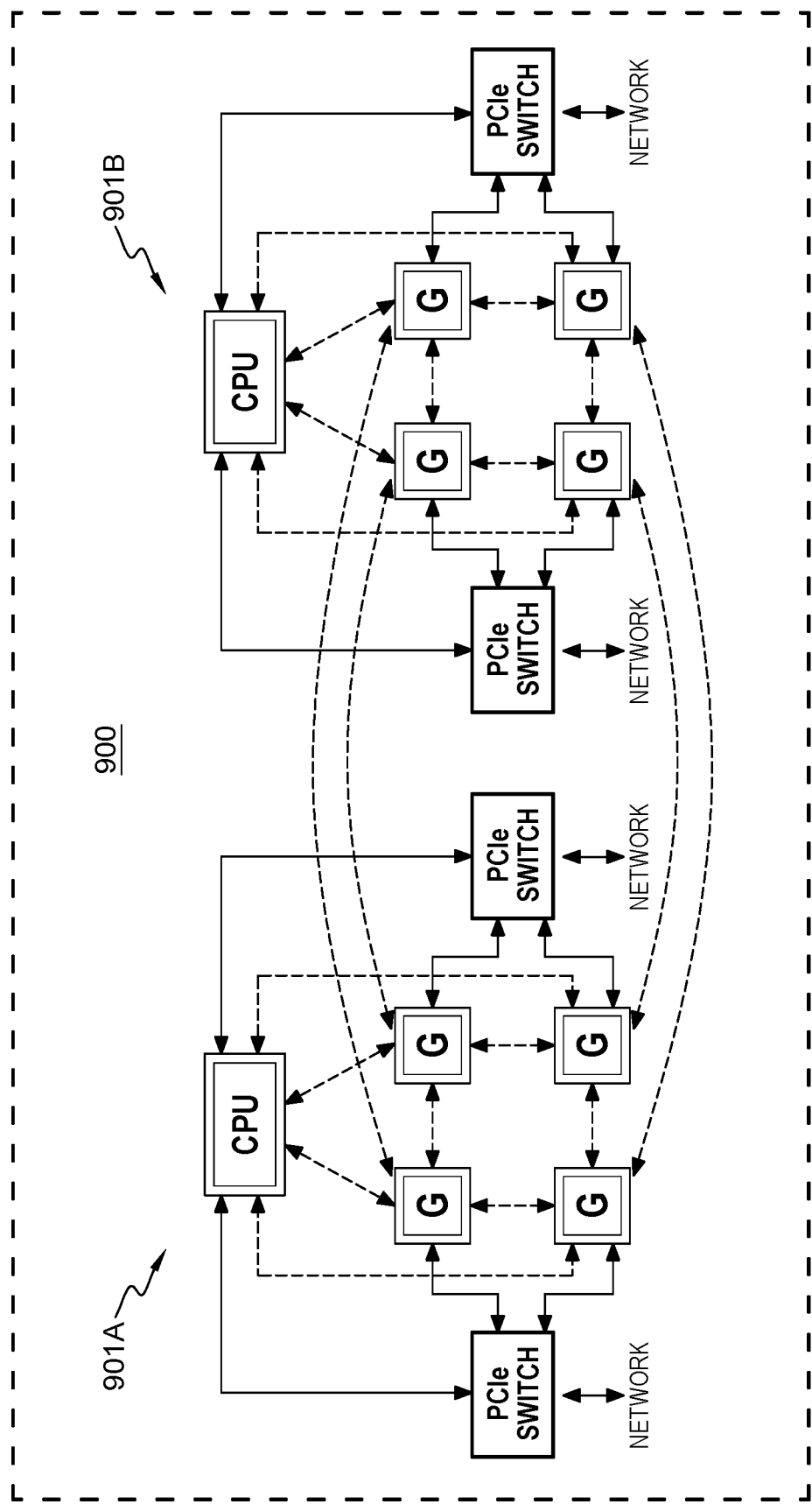
FIGS. 9A-9F depict various high-speed GPU/CPU communication link and PCIe bus network architectures based upon different combinations of configurable high-speed GPU/CPU communication link cable connections and different PCIe bus connections.

FIGS. 9A-9F depict various high-speed GPU/CPU communication link and PCIe bus network architectures hardwired on-board a PCB platform (motherboard) that are based upon different combinations of configurable high-speed GPU/CPU communication link, e.g., NVLink, cable connections and certain PCIe bus connections. In one embodiment, shown in FIG. 9A is an example network topology configuration 900 of two high-speed clusters 901A, 901B of CPU/GPUs, each GPU of the cluster is configured with a direct link connection to the CPU of that cluster enabling faster data transfer to each GPU. In the example embodiment depicted, all GPU's cannot talk to each other in the same cluster. Furthermore, a routing time via system memory may be increased.

Figure 9B:
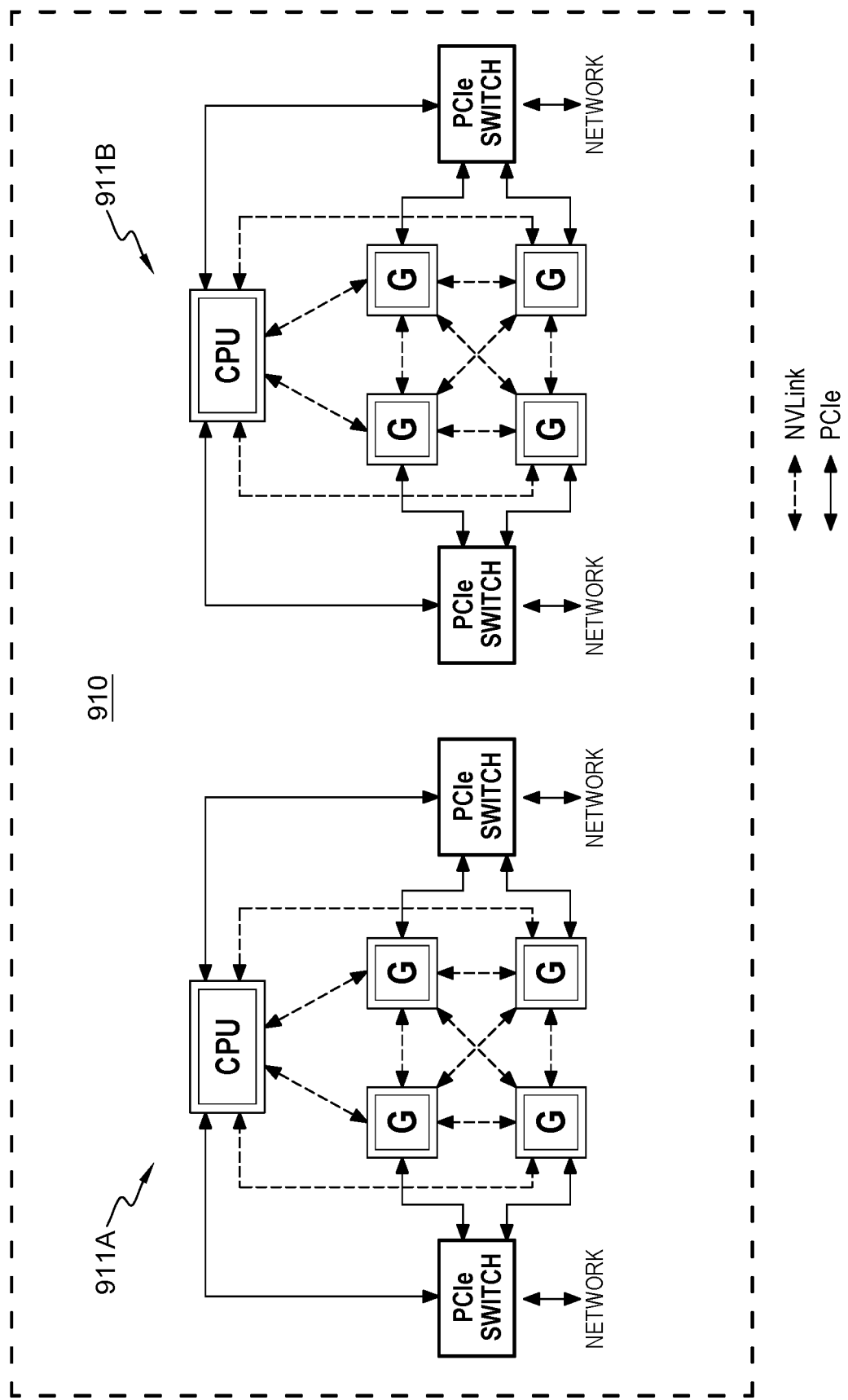

Shown in FIG. 9B is an example network topology configuration 910 of two high-speed clusters 911A, 911B of CPU/GPUs, the clusters configured such that all GPUS in the same cluster are connected. In this embodiment, there are no cross-cluster links connecting GPUs across the clusters and all topologies cannot be instantiated. Communications across clusters is through system memory, e.g., via PCIe link network connection. That is, in a system built as shown in FIG. 9B without cables, data is transferred to the other cluster through system memory which will considerably affect the performance. In one embodiment, the data to the system memory can be transferred through an NVLink and into system memory and a transfer between CPUs is via any CPU-CPU link that is added.

Figure 9C:
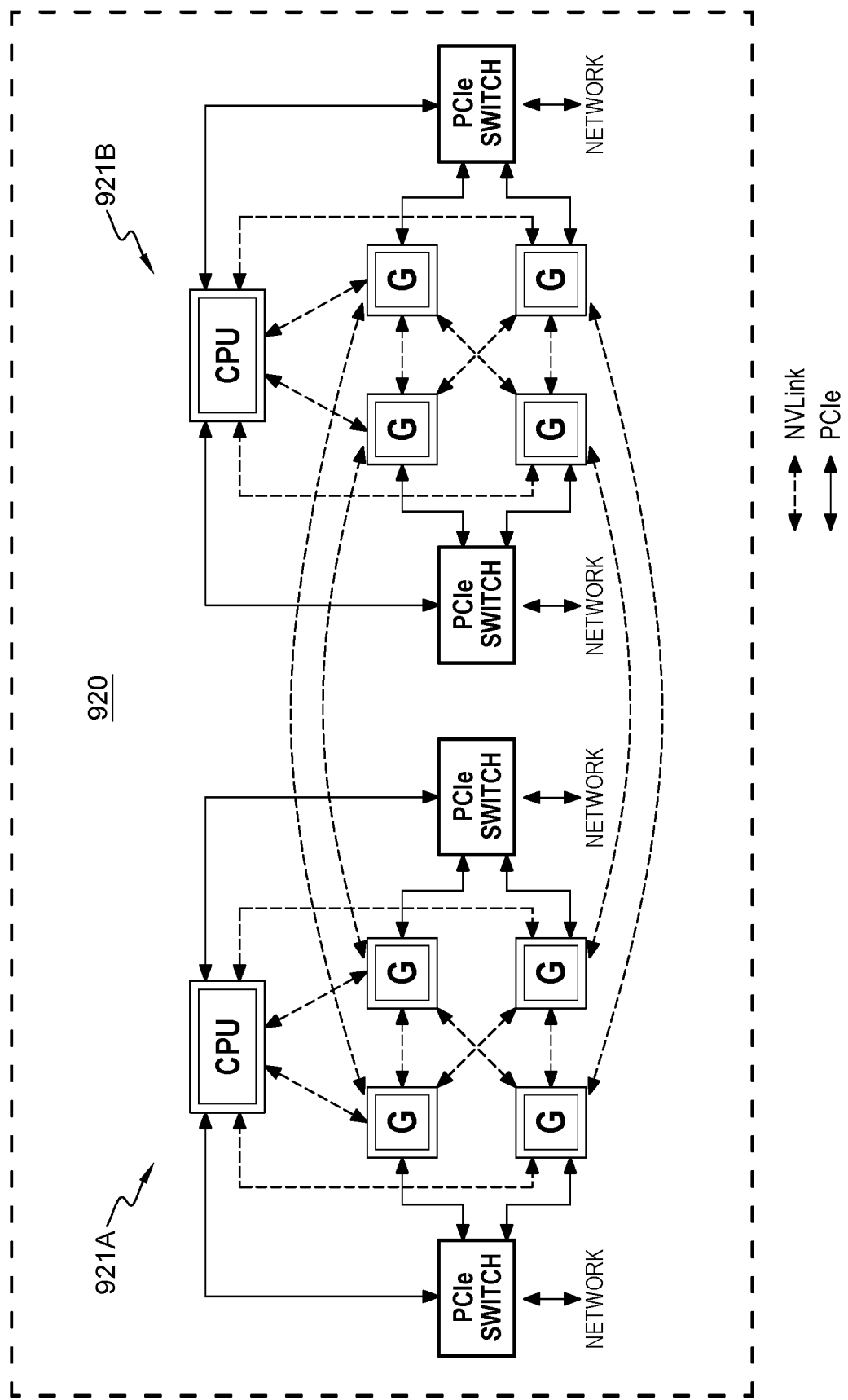

Shown in FIG. 9C is an example network topology configuration 920 of two high-speed clusters 921A, 921B of CPU/GPUs, the clusters configured such that all GPUS in the same cluster are connected. In this embodiment, a CPU may connect to a cluster of five (5) GPUs configurable to be connected together in the network. This can result in asymmetric connections within CPU clustered GPU may causing differences in data transfer latency.

Figure 9D:
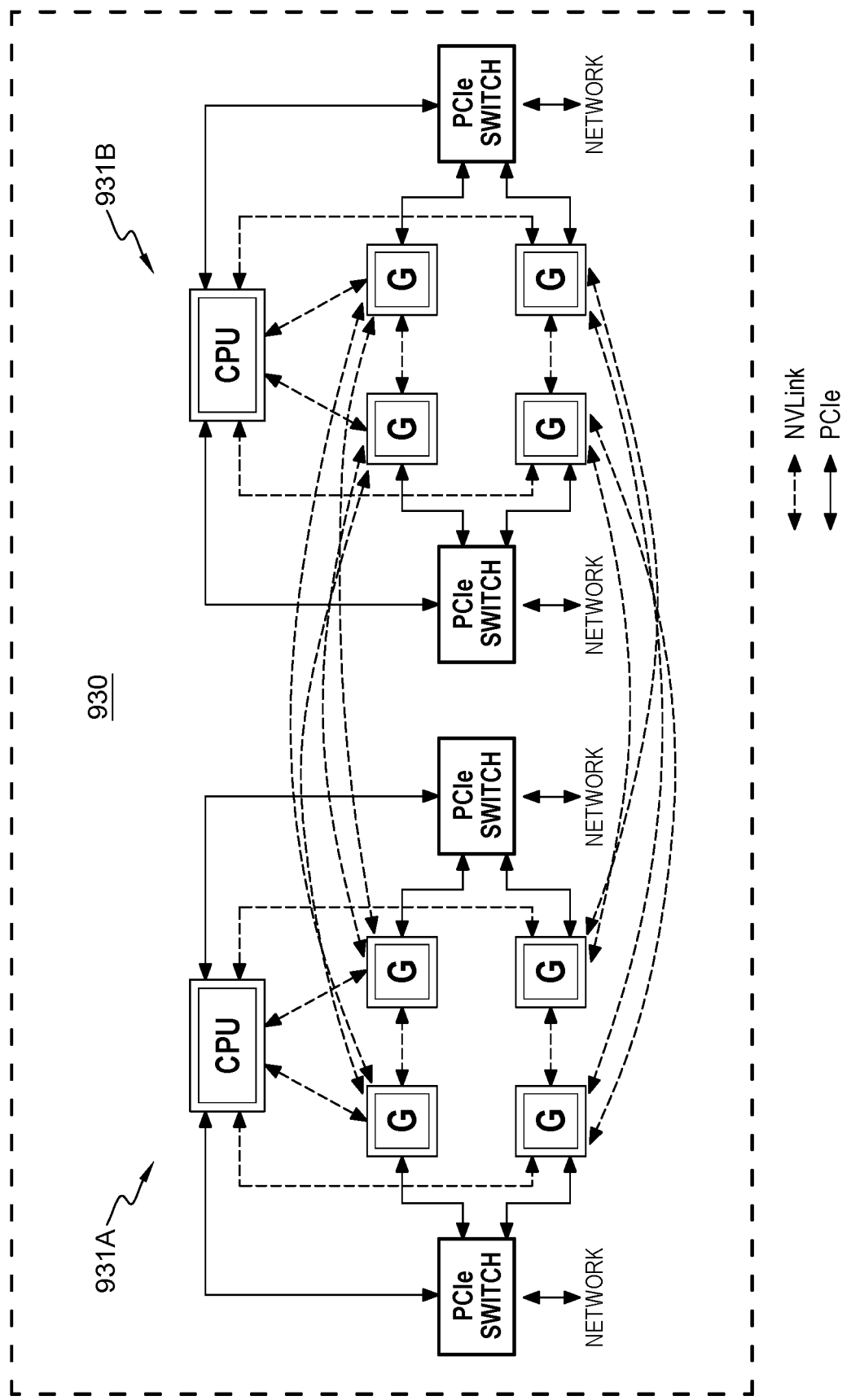

Shown in FIG. 9D is an example network topology configuration 930 of two high-speed GPU/CPU communication link clusters 931A, 931B of CPU/GPUs, the clusters configured such that not all GPUS in the same cluster are connected. In this embodiment, a CPU may connect to a cluster of five (5) GPUs configurable to be connected together in the network. This can result in asymmetric connections within CPU clustered GPU and different data transfer latencies which is beneficial for the systems that can use workloads targeting this topology.

Figure 9E:
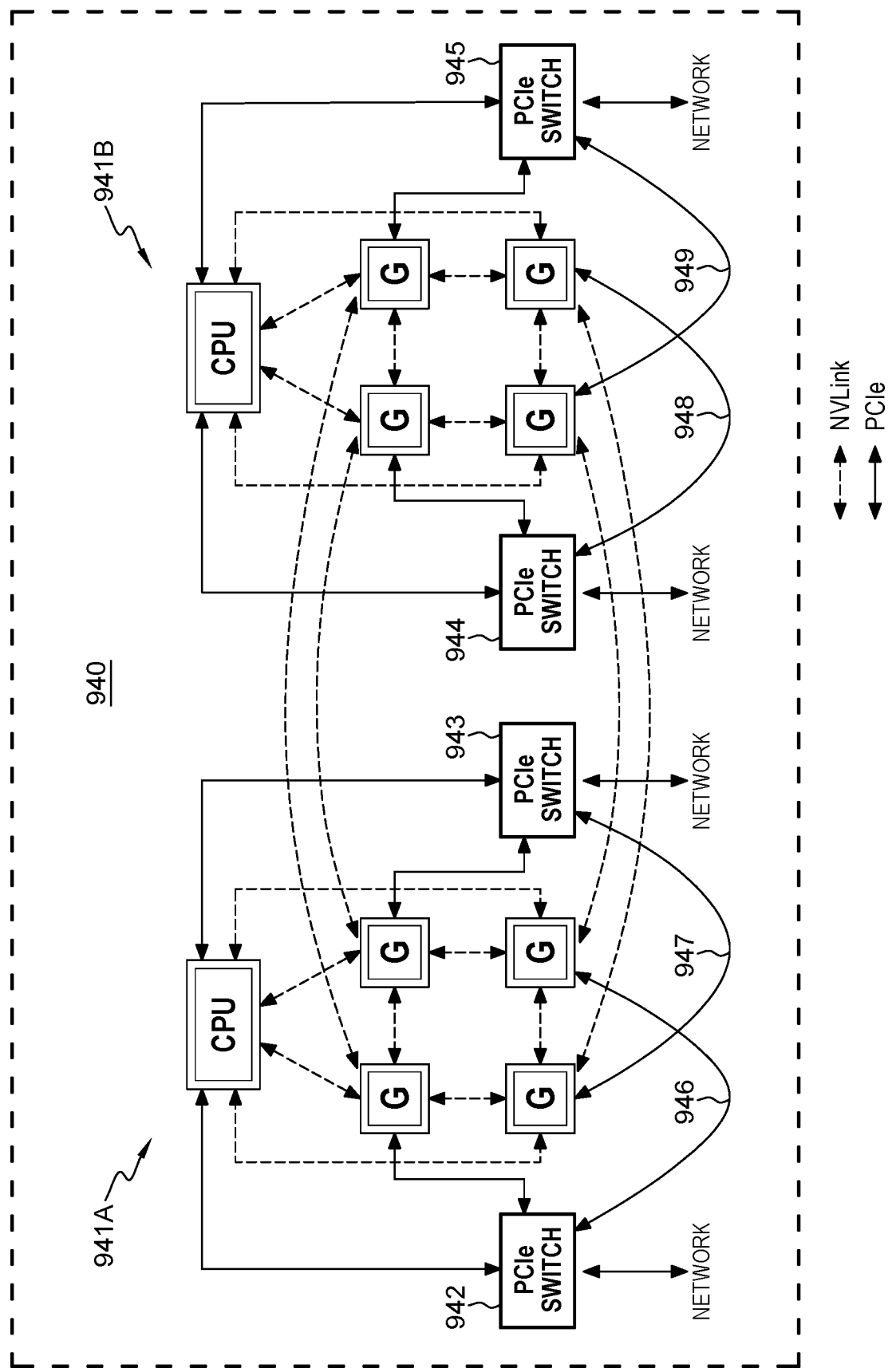

Shown in FIG. 9E is an example network topology configuration 940 of two high-speed clusters 941A, 941B of CPU/GPUs, the clusters configured such that all GPUS in the same cluster are connected. In this embodiment, a CPU may connect to a cluster of five (5) GPUs configurable to be connected together in the network. This can result in asymmetric connections within CPU clustered GPU resulting in different latency in GPU. Note PCIe switches 942, 943, 944, 945 correspond to switches 130, 140, 160, 180 in the configurable network architecture of FIG. 1, however each respective PCIe switch 942, 943, 944, 945 includes a respective PCIe bus connection 946, 947, 948, 949 connecting to a different GPU within its cluster as compared to the configuration of FIG. 1.

Figure 9F:
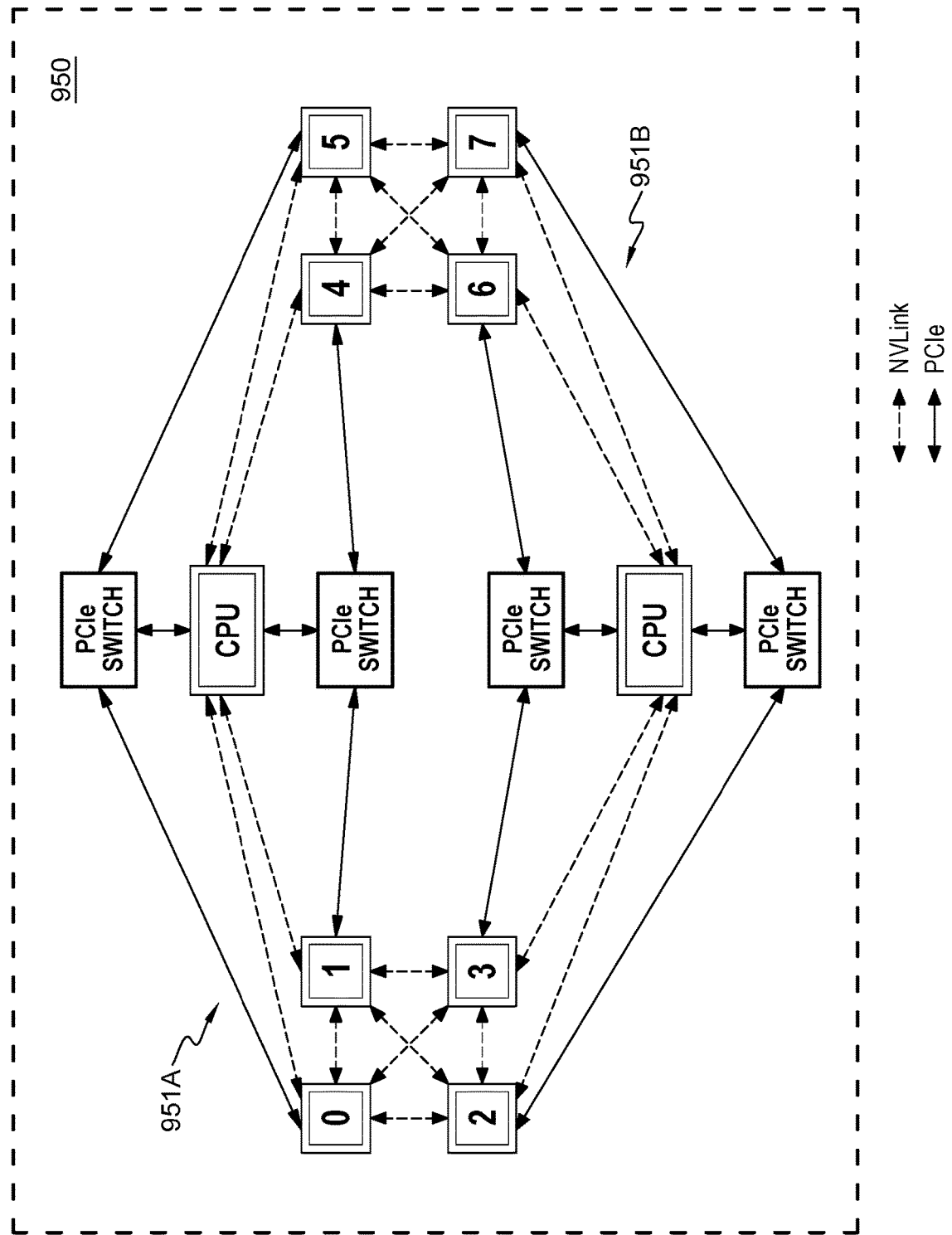

Shown in FIG. 9F is an example network topology configuration 950 of two high-speed clusters 951A, 951B of CPU/GPUs, the clusters configured with connections according to a different symmetry. In the configuration 950, four (4) GPU's in the cluster are connected together through high-speed GPU/CPU communication link connections, e.g., NVLink. Data transfers between GPU clusters 951A, 951B are through PCIe bus and PCIe switches.

Figure 10:
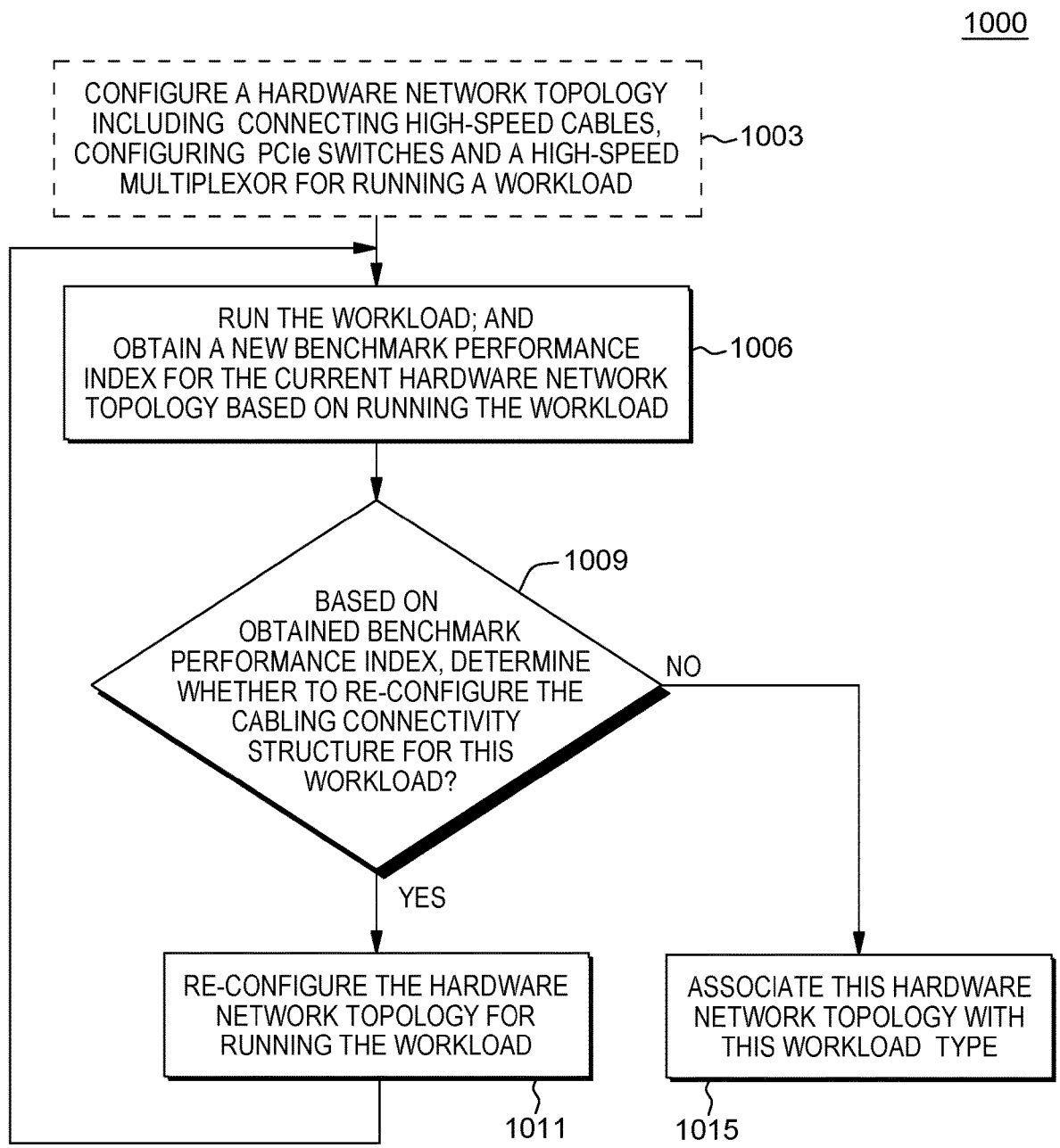
FIG. 10 shows a method for associating a hardware network topology for a particular workload run by a CPU in accordance with an embodiment.

FIG. 10 shows a method 1000 for associating a hardware network topology for a particular workload run by a CPU in accordance with an embodiment. In one embodiment, the hardware topology can be arrived by a user connecting a GPU in one of the multiple different configurations.

At first step 1003, a network topology is configured, e.g., according, but not limited to, the re-configurable network architectures of FIGS. 1-9F. A user may physically terminate some or all of the GPU high speed links to a (NVLink) connector or cable, and wire the PCIe switch interface for peer-to-peer (P2P) connectivity to other PCIe based NVME or Infiniband (IB) adapters. The PCIe interfaces may further be enabled to aid in high-speed training used to obtain CPU/GPU connectivity information and results in connectivity details, latency and bandwidth or links.

The configured topology can incorporate the multiplexor switch and includes terminating the high speed links to a connector or cable. The high-speed links, PCIe switch configuration and multiplexor connections are made to enable one or more types of data transfers a workload can make use of. The high-speed link connections can be made as per a required topology and bandwidth and latency requirement. That is, the multiple different ways to connect a GPU(s), results in different data movements, e.g., between a GPU to GPU, GPU to CPU. In one embodiment, each different configuration provides an associated performance index that can be optimized for running different kinds of applications (e.g., Neural network, Con V (convolution neural network), imaging, Artificial Intelligence Deep learning and machine learning, etc).

At 1006, the particular workload is run on the configured hardware network topology. A controller unit 99 running on the carrier platform having the re-configurable network runs training procedures for obtaining a benchmark performance index for the current hardware network topology based on running the workload. Such an index may be based upon bandwidth and latency measurements when transferring or moving data between GPU elements.

Then, at 1009, a determination is made as to whether the obtained benchmark for the current network configuration is acceptable for this workload type. If the obtained benchmark of the current network configuration is not deemed acceptable for this workload type, then there is determined the need to re-configure the cabling connectivity structure of the hardware network for running this workload. Thus, the process proceeds to 1011, FIG. 10 to re-configure the hardware network topology for running the workload. This may include re-routing high-speed cable connections among connectors connecting GPUs, e.g., adding or subtracting cable connections, re-configuring the PCIe switch configurations or switching multiplexor, e.g., in order to meet bandwidth and latency requirements for the workload. Once the hardware network topology is re-configured, the process returns back to step 1006 to run the network on the current (re-configured) hardware network topology, and a new performance index benchmark is determined.

The process steps 1006-1011 are repeated until it is determined at step 1009 that the obtained performance index benchmark is acceptable for the workload. At such time, once it is determined that no new hardware network re-configuration is necessary, the process proceeds to 1015 in order to finally associate the current re-configured network topology for running that workload.

Given the re-configurability of high speed interconnects to arrive at a different topology, workloads can be characterized as they evolve, and the high-speed connections can be intelligently moved based on workload deployment. That is, system 100 provides the capability to change and adapt the data transfer topology based on topology changes and suggest improvements to the topology based on trained sequences.

Figure 11:
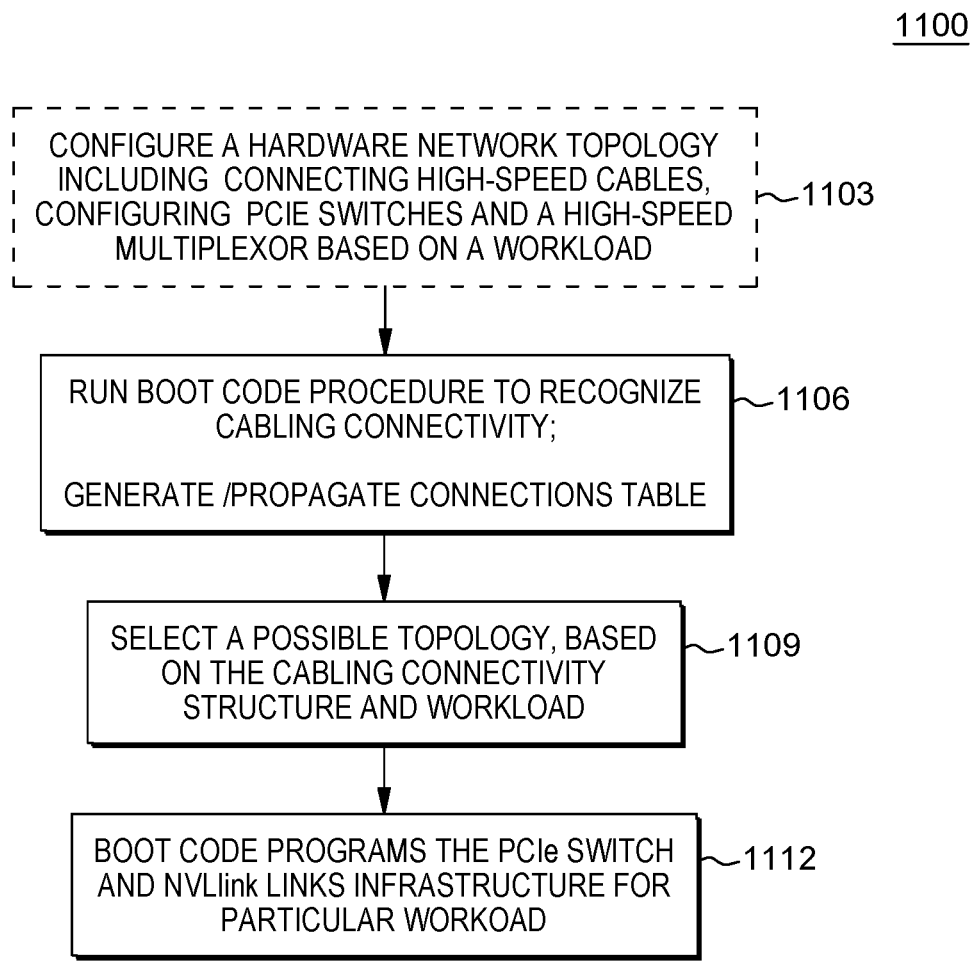
FIG. 11 shows a method for configuring a network topology for a particular workload run by a host CPU in accordance with an embodiment.

Given the re-configurability, system resources such as a software stack running the workload at the CPU, must understand the way GPU's are connected. FIG. 11 shows a method 1100 for configuring a network topology for a particular workload run by a host CPU in accordance with an embodiment.

At a first step 1103, a network topology is configured for running a particular workload. The system may be configured according to a know hardware network topology exhibiting an high performance index benchmark, such as determined according to the methods run at FIG. 10. Thus, at 1103, the hardware network topology includes connecting high-speed cables, configuring PCIe switch(es) and/or the high-speed multiplexor.

At step 1106, FIG. 10, an intelligent boot code 98 running on an on-board external controller, e.g., the baseboard management controller or like control device 99, will gather/receive data about the connectivity of the high-speed GPU/

CPU communication link to what GPU/CPU and to what hardware resources to ensure that the system becomes aware and knows of the particular CPU/GPU and GPU/GPU connections and cross-cluster GPU connections established in the current configuration. In one embodiment, a topology discovery protocol may be used to determine the current configured network configuration such as which high-speed GPU/CPU communication links are connected between which CPUs/GPUs and/or between which cluster(s). With the CPU/GPU's connected, the processor 99 determines an initial static switch configuration that defines the connectivity of the high-speed GPU/CPU communication link configured connections, identifies the topology. Then, the controller then generates a map/table of the architected network hardware topology in a machine readable format.

In one embodiment, to arrive at system map of GPU/CPU connectivity, there may be applied static inputs and dynamic high speed logic training. The processor 99 scans through the links of the cabling configuration, and at 1106, the processor creates a target lookup table that can be stored in local memory that can be consumed by another software stack (e.g., Operating System (O/S), device drivers, application layer) running at the CPU. For example, once the topology is known, and once the boot code brings the link up, it knows the link status (e.g., functional and coherent), and a table is can be created for supply to the system O/S for usage of the links. Once in a machine language format, the existing hardware mapped connection table is propagated and made available to its software stack, where the O/S software stack can refer to the connections table and create data transfer topologies based on the bandwidth and latency, to arrive at possible method of data transfer(s).

At 1109, FIG. 11, from the cabling configuration, the processor selects the possible topology based on the workload. For example, receiving inputs from the user via an interface and the results of a training process during which the number and connectivity of links and hence bandwidth is determined, the system determines a proper topology. For example, a user can indicate the given topology and connectivity rules can be set on how the communications can happen which may then be stored in a rules file which also can be modified and the workload while running can make use of it. At 1112, FIG. 11, once network configuration is identified, the configured topology information is provided to the boot code running on the platform. The boot coder device then initializes and boots a network topology configuration (e.g., programs the PCIe bus switch and bus channels and high-speed GPU/CPU communication link cabling infrastructure) according to the generated map/table using boot code tailored accordingly for the workload to be run.

Figure 12:
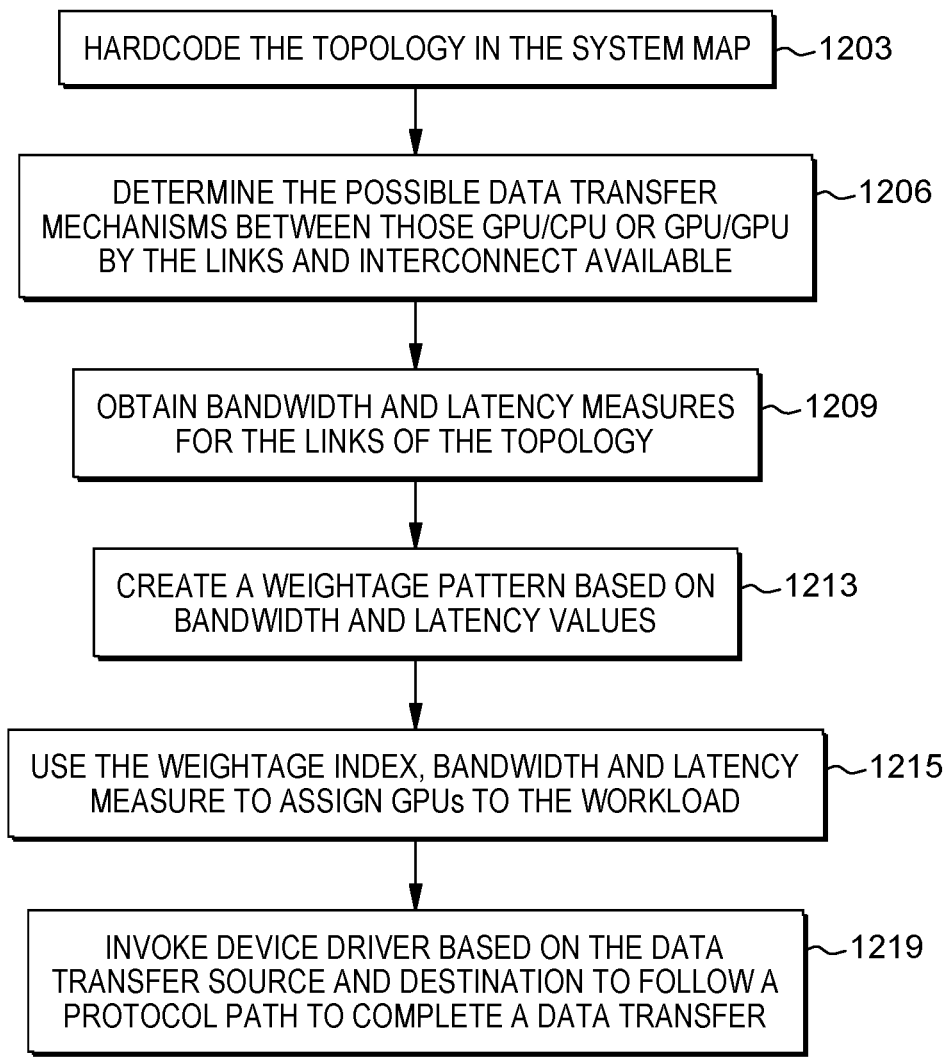
FIG. 12 depicts a method for enabling the device drivers running on the configured network system to employ better GPU data transfer techniques.

FIG. 12 depicts a method 1200 for enabling the device drivers running on the configured network system to employ better GPU data transfer techniques. At 1203, based on the link connectivity, the topology is hardcoded into the system map for storage and use by the system. At 1206, based on the system map, the system determines the possible data transfer mechanisms between those GPU/CPU and/or GPU/GPU by the links and interconnects available.

At 1209, FIG. 12, in one embodiment, the created system map or table is populated for each possible link with training results information. For example, once the complete details of the bandwidth and latency are obtained, the device driver assigns GPU numbers based on the connectivity and allows the overlying O/S, application layer, etc. to use the GPU in weightage manner. Thus, the GPUs may be assigned based on weightage to enable the better performance by the application layer. As an example, a generated table content can include: i) GPU number connectivity to another GPU; ii) data transfer bandwidth; and iii) latency.

At 1213, FIG. 12, for the transfer mechanisms, based on the linked high-speed connections, the system creates a weightage pattern based on the links bandwidth and latency results and allows the overlying workloads to adapt to the best GPU. In one embodiment, the generated look up table is consumed by the software stack, and the weightage of a data transfer based on bandwidth and latency is accumulated. For example, GPU-GPU transfers are faster especially if a GPU is provided with two high-speed link connection which increases bandwidth. The PCI switch/links are not as fast as the GPU-GPU transfers.

In an example use scenario, a communication about the GPU and the use of the GPU based on the performance benchmark can be targeted towards a specific GPU. For example, a GPU_1 in a topology can perform a master as against GPU_2 which also can perform as a master if the topology is changed. Thus, in an embodiment, at step 1215, FIG. 12, the application layer running at the host CPU may use the weightage index, bandwidth and latency measure to arrive at possible GPU assignation to the workload, and at 1219, invokes a device driver based on the data transfer source and destination to follow the protocol path to complete the data transfer. For example, a benchmark may select use of a higher weighted GPUs in the topology for a given workload so the benchmark can perform better, as opposed to a more loosely connected GPU having less weightage, which may perform worse.

In an embodiment, the application layer can be forced GPU usage even though a weightage index settles to different GPU.

In a further embodiment, a performance benchmark can then employ a mechanism to select a GPU topology where the format of communication is matched against the weightage table to perform actions by the required GPU. As an example, for a given topology where the bandwidth and latency of GPU communication differ by the way of their connectivity, the weightage will provide an assessment to the workload on what part of their process in the workload needs to be offloaded to a specific GPU.

At any given time, the application or the benchmark, can deploy CPU/GPU data movement in sync with the current topology, in other words, purely adaptive to the hardware, then the best performance is achieved in terms of improved latency, lower cost, and power consumption.

In further embodiments, arrays of multiple re-configurable network architecture motherboards each, for example, having a same mechanical physical and thermal layout, may be employed as a rack-mounted systems each singularly or in combination with ability to configure and/or reconfigure the architecture by interconnecting CPU and GPU processing nodes using cable links on same or different motherboards.

Figure 13:
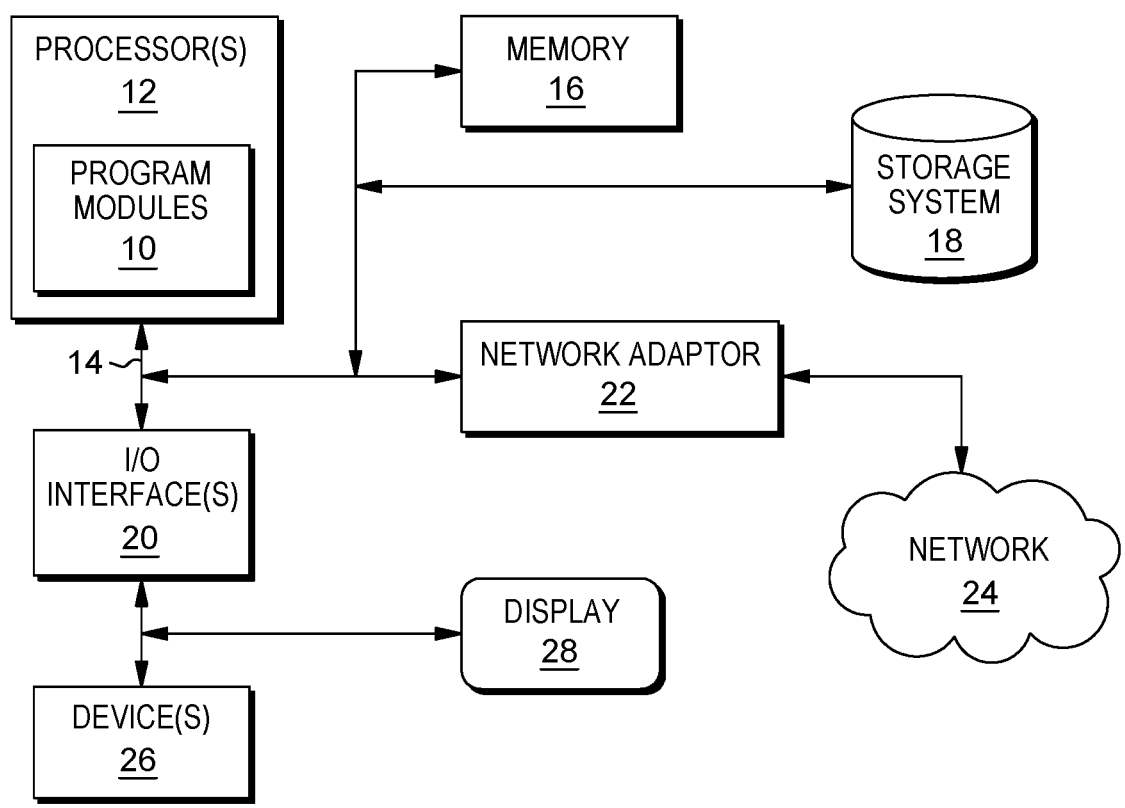
FIG. 13 depicts an exemplary system in accordance with embodiments of the present invention.

FIG. 13 illustrates an example computing system in accordance with the present invention that may provide the functions associated with booting and benchmarking re-configured hardware topologies in according with the present embodiments. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 10-12.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A configurable hardware network architecture comprising:
    a printed circuit board (PCB) platform having wired connections for routing signals between electronic devices, said electronic devices comprising multiple graphics processor units (GPUs) for carrying out first sets of operations; and at least one control processor units (CPUs) for carrying out second sets of operations; and a memory storage associated with one or more said CPUs and GPUs;
    a first CPU of said at least one CPUs having a first multiple said GPUs associated therewith, said first CPU having associated multiple one or more high-speed connectors for providing communications at a first byte speed, the high-speed connectors of said first CPU available for cable-connection at said PCB connections platform; and
    each said first multiple said GPUs associated with said first CPU having an associated high-speed connector for providing communications at the first byte speed, the high-speed connectors of each said first multiple GPUs available for cable-connection at said PCB connections platform;
    said network architecture configurable by directly connecting one or more first high speed interface cable links for communications at a first byte speed between a high-speed connector of the first CPU and a respective high-speed connector of an associated GPU of said first multiple GPUs, and/or by directly connecting using first high speed interface cable links between GPUs of said first multiple GPUs for communications at the first byte speed, and further comprising:
    a first high speed switch configurable for enabling switched hardwire connections on said PCB platform allowing communications at a second byte speed between said first CPU and a first subset of GPUs of said first multiple GPUs, communications at the second byte speed between GPUs of said first multiple GPUs, and communications to an external network;

a second high speed switch on said PCB platform configurable for enabling switched hardwire connections on said PCB platform allowing communications at the second byte speed between said first CPU and a second subset of GPUs of said first multiple GPUs, communications at the second byte speed between GPUs of said first multiple GPUs, and communications to the external network; and a second CPU of said at least one CPUs having a second multiple said GPUs associated therewith, said second CPU having an associated one or more said first high-speed connectors for providing communications at said first byte speed, the high-speed connectors of said second CPU available for cable-connection at said PCB connections platform; and each said second multiple GPUs associated with said second CPU having an associated high-speed connector for providing communications at the first byte speed, the high-speed connectors of each said second multiple GPUs available for cable-connection at said PCB connections platform;

said network architecture further configurable by directly connecting one or more first high speed interface cable links for communications at said first byte speed between a high-speed connector of the second CPU and a respective high-speed connector of an associated GPU of said second multiple GPUs, and/or by directly connecting using first high speed interface cable links between one or more GPUs of said second multiple GPUs for communications at the first byte speed, wherein a network topology is re-architected by providing different direct connections using said first high speed interface links based on a workload requirement;

a third high speed switch configurable for enabling switched hardwire connections on said PCB platform allowing communications at said second byte speed between said second CPU and a first subset of GPUs of said second multiple GPUs, communications at said second byte speed between GPUs of said second multiple GPUs, and communications to the external network;

a fourth high speed switch on said PCB platform configurable for enabling switched hardwire connections on said PCB platform allowing communications at a second byte speed between said second CPU and a second subset of GPUs of said second multiple GPUs, communications at said second byte speed between GPUs of said second multiple GPUs, and communication to the external network;

a switched multiplexor configurable to provide a switched wired connection on said PCB platform for allowing communications between said first CPU and one or more said GPUs of said first subset of said first multiple GPUs and the external network via said second high speed switch at said second byte speed; and the switched multiplexor being further configurable to provide a further switched wired connection on said PCB platform for allowing communications between said second CPU and one or more said GPUs of said second subset of said second multiple GPUs and the external network via said fourth high speed switch at said second byte speed, wherein a network topology is re-architected by providing different direct connections using said first high speed interface links based on a workload requirement.

2. The configurable hardware network architecture of claim 1, wherein said directly connecting one or more GPUs of said first multiple GPUs for communications at the first byte speed comprises using a first high speed interface cable link to connect respective said high-speed connectors of:
   a first GPU and a second GPU of said first multiple GPUs;
   a third GPU and a fourth GPU of said first multiple GPUs;
   the first GPU and the third GPU of said first multiple GPUs; and/or
   the second GPU and the fourth GPU of said first multiple GPUs.

3. The configurable hardware network architecture of claim 2, wherein said first GPU is hardwire connected in said PCB platform to each said third GPU and fourth GPU of said first multiple GPUs via respective high speed communication links on said PCB platform for communications at said first byte speed, and said second GPU is hardwire connected in said PCB platform to each said third GPU and fourth GPU of said first multiple GPUs via respective high speed communication links on said PCB platform for communications at said first byte speed.

4. The configurable hardware network architecture of claim 2, wherein said directly connecting one or more GPUs of said second multiple GPUs for communications at the first byte speed comprises using a first high speed interface cable link to connect respective said high-speed connectors of:
   a fifth GPU and a sixth GPU of said second multiple GPUs;
   a seventh GPU and an eighth GPU of said second multiple GPUs;
   the fifth GPU and the seventh GPU of said second multiple GPUs; and/or
   the sixth GPU and the eighth GPU of said second multiple GPUs.

5. The configurable hardware network architecture of claim 4, wherein said fifth GPU is hardwire connected in said PCB platform to each said seventh GPU and eighth GPU of said second multiple GPUs via respective high speed communication links on said PCB platform for communications at said first byte speed, and said sixth GPU is hardwire connected in said PCB platform to each said seventh GPU and eighth GPU of said second multiple GPUs via respective high speed communication links on said PCB platform for communications at said first byte speed.

6. The configurable hardware network architecture of claim 4, wherein said switched multiplexor comprises:
   a cross-switching multiplexor configurable to provide a switched wired connection on said PCB platform for allowing direct high-speed communications at said second byte speed between said first CPU and said seventh GPU and eighth GPU of said second multiple GPUs, and the external network via said fourth high speed switch; said cross-switching multiplexor further configurable to provide a switched wired connection on said PCB platform for allowing direct high-speed communications at said second byte speed between said second CPU and said third GPU and fourth GPU of said first multiple GPUs and the external network via said second high speed switch.

7. The configurable hardware network architecture of claim 1, wherein a GPU of said first multiple GPUs is hardwire connected on said PCB platform to at least a respective GPU of said second multiple GPUs via respective high speed communication links on said PCB platform for communications at said first byte speed.

8. The configurable hardware network architecture of claim 1, wherein said network architecture is further configurable by directly connecting a high speed interface cable link for communications at said first byte speed between a high-speed connector of a GPU of said first multiple GPUs and a high-speed connector of a GPU of said second multiple GPUs.

9. The configurable hardware network architecture of claim 1, wherein said network architecture is further configurable by directly connecting one or more first high speed interface cable links for enabling communications at a first byte speed between a high-speed connector of the first CPU and a respective high-speed connector of an associated GPU of said second multiple GPUs.

10. The configurable hardware network architecture of claim 1, wherein said network architecture is further configurable by directly connecting one or more first high speed interface cable links for enabling communications at a first byte speed between a high-speed connector of the second CPU and a respective high-speed connector of an associated GPU of said first multiple GPUs.

11. A method of configuring a hardware network architecture for running a workload, the method comprising:
directly connecting one or more first high-speed interface cable links for communications at a first byte speed between a corresponding high-speed connector of a first central processing unit (CPU) on a printed circuit board (PCB) platform having wired connections for routing signals between electronic devices, and a respective high-speed connector of an associated graphics processing unit (GPU) of first multiple GPUs on the PCB platform, and/or directly connecting using first high speed interface cable links between connectors at one or more GPUs of said first multiple GPUs for communications at the first byte speed;
directly connecting one or more first high speed interface cable links for communications at said first byte speed between a high-speed connector of a second CPU on the PCB platform having wired connections for routing signals between electronic devices, and a respective high-speed connector of an associated GPU of second multiple GPUs on the PCB platform, and/or directly connecting using first high speed interface cable links between connectors at one or more GPUs of said second multiple GPUs for communications at the first byte speed;
determining a hardware network topology based on the directly connected one or more first high-speed interface cable links between said first CPU and said first multiple GPUs and between GPUs of said first multiple GPUs and based on based on the directly connected one or more first high-speed interface cable links between said second CPU and said second multiple GPUs and between GPUs of said second multiple GPUs;
running, using a controller, a workload run at the first CPU and/or second CPU using said determined hardware network topology;
obtaining, using the controller, a benchmark performance index for the hardware network topology based on running the workload;
based on the obtained benchmark performance index for the hardware network topology, re-configuring the hardware network topology by adding or subtracting one or more direct connected cable links between the first CPU and a GPU of said first multiple GPUs or between GPUs of said first multiple GPUs, or by adding or subtracting one or more direct connected cable links between the second CPU and a GPU of said second multiple GPUs or between GPUs of said second multiple GPUs, said re-configuring further comprising:
configuring a first high speed switch for enabling switched hardwire connections on said PCB platform allowing one or more of: communications at a second byte speed between said first CPU and a first subset of GPUs of said first multiple GPUs, communications at the second byte speed between GPUs of said first multiple GPUs, and communications to an external network;
configuring a second high speed switch on said PCB platform for enabling switched hardwire connections on said PCB platform allowing one or more of: communications at the second byte speed between said first CPU and a second subset of GPUs of said first multiple GPUs, communications at the second byte speed between GPUs of said first multiple GPUs, and communications to the external network;
configuring a third high speed switch for enabling switched hardwire connections on said PCB platform allowing one or more of: communications at said second byte speed between said second CPU and a first subset of GPUs of said second multiple GPUs, communications at said second byte speed between GPUs of said second multiple GPUs, and communications to the external network;
configuring a fourth high speed switch on said PCB platform for enabling switched hardwire connections on said PCB platform allowing one or more of: communications at a second byte speed between said second CPU and a second subset of GPUs of said second multiple GPUs, communications at said second byte speed between GPUs of said second multiple GPUs, and communication to the external network; and
configuring a switched multiplexor to provide a switched wired connection on said PCB platform for allowing communications between said first CPU and one or more said GPUs of said first subset of said first multiple GPUs and the external network via said second high speed switch at said second byte speed; and/or provide a further switched wired connection on said PCB platform for allowing communications between said second CPU and one or more said GPUs of said second subset of said second multiple GPUs and the external network via said fourth high speed switch at said second byte speed
configuring a switched multiplexor to provide a switched wired connection on said PCB platform for allowing communications between said first CPU and one or more said GPUs of said further sub-set of said first multiple GPUs and a second external network connection via said second high speed switch at said second byte speed; and/or
further configuring the switched multiplexor to provide a further switched wired connection on said PCB platform for allowing communications between said second CPU and one or more said GPUs of said further sub-set of said second multiple GPUs and the fourth external network connection via said fourth high speed switch at said second byte speed.

12. The method according to claim 11, further comprising:
running, using the controller, the workload run at a CPU using said re-configured hardware network topology;

obtaining, using the controller, a further benchmark performance index for the re-configured hardware network topology based on running the workload; and repeating the running of said workload using on said re-configured hardware network topology, the obtaining of further benchmark performance indexes for each hardware network re-configuration, and the re-configuring of said hardware network topology based on running the workload until a performance index of a re-configured hardware network topology is optimized for running said workload.

13. The method according to claim 12, wherein said re-configuring comprises: adding or subtracting one or more cable link connections between the GPU and a CPU and/or between the GPU and another GPU.

14. The method according to claim 11, wherein said obtaining a benchmark performance index comprises:
   determining a bandwidth for a GPU configured in said hardware topology based on a number of cable link connections to the GPU; and
   determining a latency for transferring data between the GPU and a CPU or the GPU and another GPU.

15. The method of claim 11, wherein said re-configuring further comprises:
   directly connecting one or more first high speed interface cable links for enabling communications at a first byte speed between a high-speed connector of the first CPU and a respective high-speed connector of an associated GPU of said second multiple GPUs; and/or
   directly connecting one or more first high speed interface cable links for enabling communications at a first byte speed between a high-speed connector of the second CPU and a respective high-speed connector of an associated GPU of said first multiple GPUs.

16. A method of configuring a hardware network architecture for running a workload, the method comprising:
   directly connecting one or more first high-speed interface cable links for communications at a first byte speed between a corresponding high-speed connector of a first central processing unit (CPU) on a printed circuit board (PCB) platform having wired connections for routing signals between electronic devices, and a respective high-speed connector of an associated graphics processing unit (GPU) of first multiple GPUs on the PCB platform, and/or directly connecting using first high speed interface cable links between connectors at one or more GPUs of said first multiple GPUs for communications at the first byte speed;
   directly connecting one or more first high-speed interface cable links for communications at said first byte speed between a high-speed connector of a second CPU on the PCB platform having wired connections for routing signals between electronic devices, and a respective high-speed connector of an associated GPU of second multiple GPUs on the PCB platform, and/or directly connecting using first high speed interface cable links between connectors at one or more GPUs of said second multiple GPUs for communications at the first byte speed,
   determining, by a processor, a hardware network topology based on the directly connected one or more first high-speed interface cable links between said first CPU and said first multiple GPUs and between GPUs of said first multiple GPUs and based on the directly connected one or more first high-speed interface cable links between said second CPU and said second multiple GPUs and between GPUs of said second multiple GPUs;

said hardware network topology further determined based on:
   a configuration of a first high speed switch configurable for enabling switched hardwire connections on said PCB platform allowing one or more of: communications at a second byte speed between said first CPU and a first subset of GPUs of said first multiple GPUs, communications at the second byte speed between GPUs of said first multiple GPUs, and communications to an external network;
   a configuration of a second high speed switch configured for enabling switched hardwire connections on said PCB platform allowing one or more of: communications at the second byte speed between said first CPU and a second subset of GPUs of said first multiple GPUs, communications at the second byte speed between GPUs of said first multiple GPUs, and communications to the external network;
   a configuration of a third high speed switch configured for enabling switched hardwire connections on said PCB platform allowing one or more of: communications at said second byte speed between said second CPU and a first subset of GPUs of said second multiple GPUs, communications at said second byte speed between GPUs of said second multiple GPUs, and communications to the external network;
   a configuration of a fourth high speed switch configured for enabling switched hardwire connections on said PCB platform allowing one or more of: communications at a second byte speed between said second CPU and a second subset of GPUs of said second multiple GPUs, communications at said second byte speed between GPUs of said second multiple GPUs, and communication to the external network; and
   a configuration of a switched multiplexor to provide a switched wired connection on said PCB platform for allowing communications between said first CPU and one or more said GPUs of said first subset of said first multiple GPUs and the external network via said second high speed switch at said second byte speed; and/or provide a further switched wired connection on said PCB platform for allowing communications between said second CPU and one or more said GPUs of said second subset of said second multiple GPUs and the external network via said fourth high speed switch at said second byte speed; and
   initiating, by said processor, a running of a boot process for initializing the determined hardware network topology configuration for running said workload;
   generating a system map specifying cable link connectivities of said hardware network topology;
   providing said generated system map to an application program to be run on said first CPU or the second CPU, said application program using said system map for optimizing running of said workload on said determined hardware network topology.

17. The method according to claim 16, further comprising:
   measuring, by said application program, based on said map, a bandwidth and a latency value for running a particular workload by said first CPU or the second CPU;
   determining, using said application program, a weightage associated with one or more GPU's of said first multiple GPUs and said second multiple GPUs based on said data transfer bandwidth and latency values; and assigning a GPU to a particular workload based on said determined GPU weightage.

18. The method according to claim 17, wherein said measuring comprises: running a training sequence including data transfer operations on said links configured in said hardware network to obtain said bandwidth and latency values.

19. The method according to claim 16, wherein said determining said hardware network topology further comprises:

determining a use of said first high-speed and said second high-speed switches for high-speed switching of connections between said first CPU and GPUs of said first multiple GPUs and between one or more said GPUs of said first multiple GPUs to create one or more side-band links in said network topology; and/or only coherent links; and determining a use of said third high-speed and said fourth high-speed switches for high-speed switching of connections between said second CPU and GPUs of said second multiple GPUs and between one or more GPUs of said second multiple GPUs to create one or more side-band links in said network topology; and/or only coherent links; and determining a use of said switched multiplexor to switch in or out said one or more side-band links.

20. The method of claim 16, wherein said hardware network topology is further determined based on:

a configuration of one or more first high speed interface cable links for enabling communications at a first byte speed between a high-speed connector of the first CPU and a respective high-speed connector of an associated GPU of said second multiple GPUs; and/or a configuration of one or more first high speed interface cable links for enabling communications at a first byte speed between a high-speed connector of the second CPU and a respective high-speed connector of an associated GPU of said first multiple GPUs.

* * * * *